US010194377B2

(12) United States Patent
Tian et al.

(10) Patent No.: US 10,194,377 B2
(45) Date of Patent: Jan. 29, 2019

(54) NETWORK DEVICE AND DATA BACKHAUL IMPLEMENTATION SYSTEM AND METHOD

(71) Applicant: HUAWEI TECHNOLOGIES CO., LTD., Shenzhen, Guangdong (CN)

(72) Inventors: Chunchang Tian, Beijing (CN); Yong Wu, Beijing (CN); Xinrui Feng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 120 days.

(21) Appl. No.: 15/245,599

(22) Filed: Aug. 24, 2016

(65) Prior Publication Data
US 2016/0374007 A1 Dec. 22, 2016

Related U.S. Application Data

(63) Continuation of application No. PCT/CN2014/072558, filed on Feb. 26, 2014.

(51) Int. Cl.
H04W 48/10 (2009.01)
H04W 40/00 (2009.01)
(Continued)

(52) U.S. Cl.
CPC .......... H04W 48/10 (2013.01); H04B 7/0626 (2013.01); H04L 5/0048 (2013.01);
(Continued)

(58) Field of Classification Search
CPC .. H04B 7/0626; H04B 7/0632; H04B 7/0639; H04L 5/0048; H04W 40/00; H04W 48/10; H04W 72/04; H04W 8/22
See application file for complete search history.

(56) References Cited

U.S. PATENT DOCUMENTS 8,488,514 B2 * 7/2013 Cai .................. H04W 36/30
370/315
2013/0034043 A1 * 2/2013 Yu .................. H04W 72/085
370/315
(Continued)

FOREIGN PATENT DOCUMENTS

CN 101335715 12/2008
CN 101640626 2/2010
(Continued)

OTHER PUBLICATIONS

International Search Report, dated Dec. 2, 2014, in corresponding International Application No. PCT/CN2014/072558 (4 pp.)
(Continued)

Primary Examiner — Stephen J Clawson
(74) Attorney, Agent, or Firm — Staas & Halsey LLP

(57) ABSTRACT

Embodiments of the present invention provide a network device and a data backhaul implementation system and method, which can implement centralized and dynamic allocation of backhaul resources in a network and improve a data backhaul capacity of the entire network. The method includes: obtaining, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information; and sending the backhaul control information to the second network device and the third network device, so that the second network device and the third network device backhaul data according to the backhaul control information.

15 Claims, 15 Drawing Sheets

(51) Int. Cl.
*H04B 7/06* (2006.01)
*H04L 5/00* (2006.01)
*H04W 8/22* (2009.01)
*H04W 72/04* (2009.01)

(52) U.S. Cl.
CPC .............. *H04W 8/22* (2013.01); *H04W 40/00* (2013.01); *H04W 72/04* (2013.01); *H04B 7/0632* (2013.01); *H04B 7/0639* (2013.01)

(56) References Cited

U.S. PATENT DOCUMENTS

| | | | | |
|---|---|---|---|---|
| 2013/0208669 A1* | 8/2013 | Pan | ............. | H04L 5/0048 370/329 |
| 2013/0336152 A1* | 12/2013 | Zhu | ............. | H04B 15/00 370/252 |
| 2014/0133333 A1* | 5/2014 | Liu | ............. | H04W 24/10 370/252 |
| 2014/0192672 A1* | 7/2014 | Seo | ............. | H04W 24/10 370/252 |
| 2016/0135191 A1* | 5/2016 | Negus | ............. | H04B 7/0486 370/329 |
| 2016/0374007 A1* | 12/2016 | Tian | ............. | H04W 40/00 |

FOREIGN PATENT DOCUMENTS

| | | |
|---|---|---|
| CN | 102821434 | 12/2012 |
| EP | 2296426 | 3/2011 |
| WO | WO2008095241 | 8/2008 |
| WO | WO2009113976 | 9/2009 |
| WO | WO2012000046 | 1/2012 |

OTHER PUBLICATIONS

International Search Reported, dated Dec. 2, 2014, in International Application No. PCT/CN2014/072558 (4 pp.).
Written Opinion of the International Searching Authority, dated Dec. 2, 2014, in International Application No. PCT/CN2014/072558 (7 pp.).
Extended European Search Report, dated Jan. 25, 2017, in European Application No. 14884151.3 (8 pp.).
Hiertz, G. et al., *IEEE 802.11s: The WLAN Mesh Standard*, IEEE Wireless Communications, Feb. 2010, pp. 104-111.

* cited by examiner

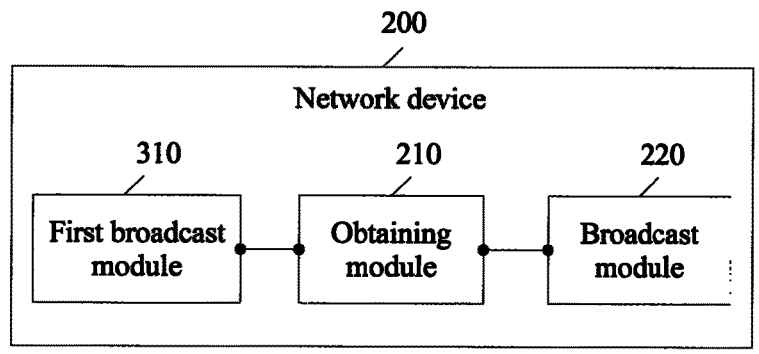
FIG. 3-a
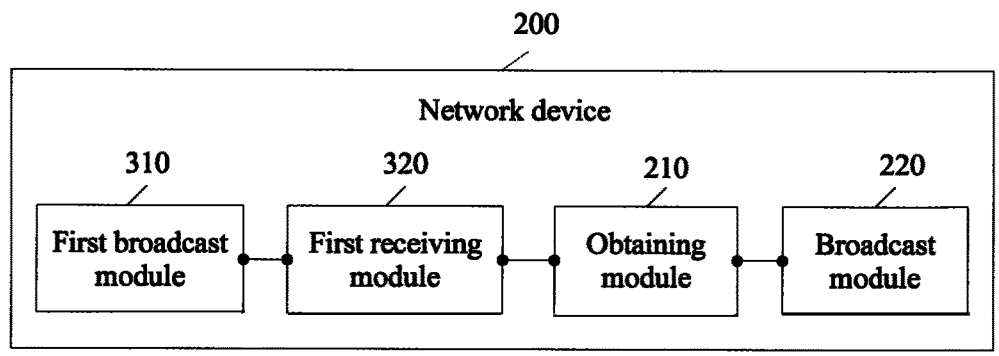
FIG. 3-b
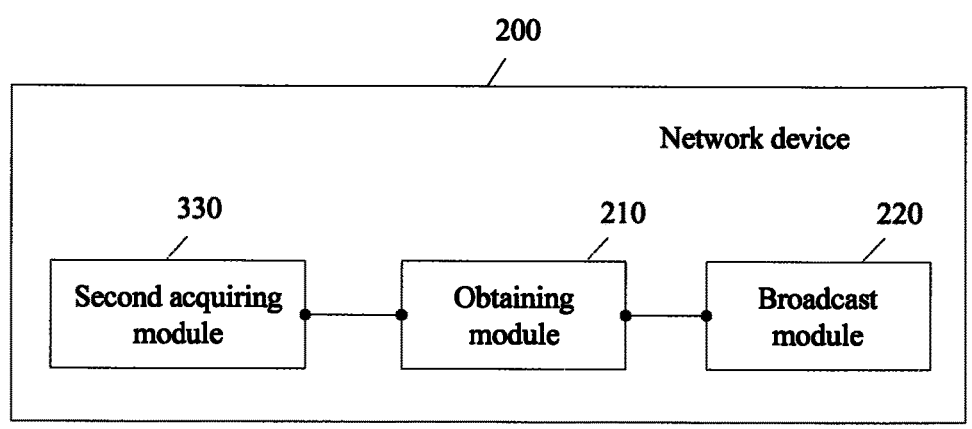
FIG. 3-c

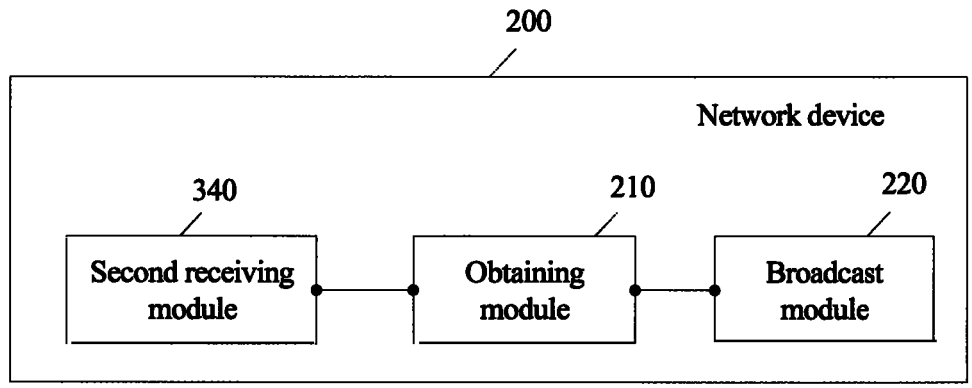
FIG. 3-d
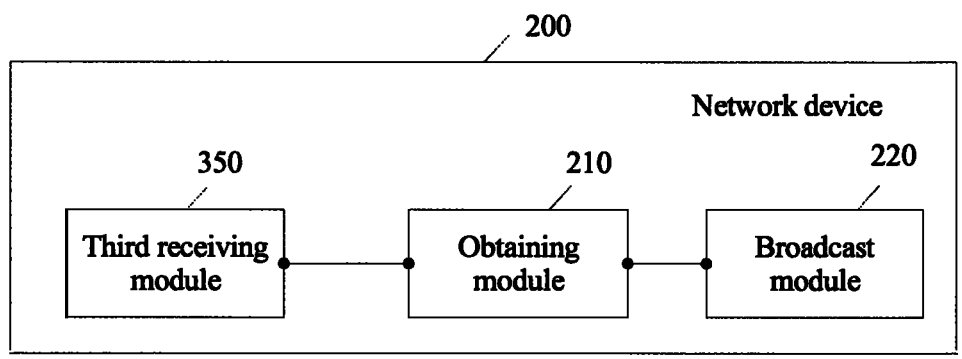
FIG. 3-e
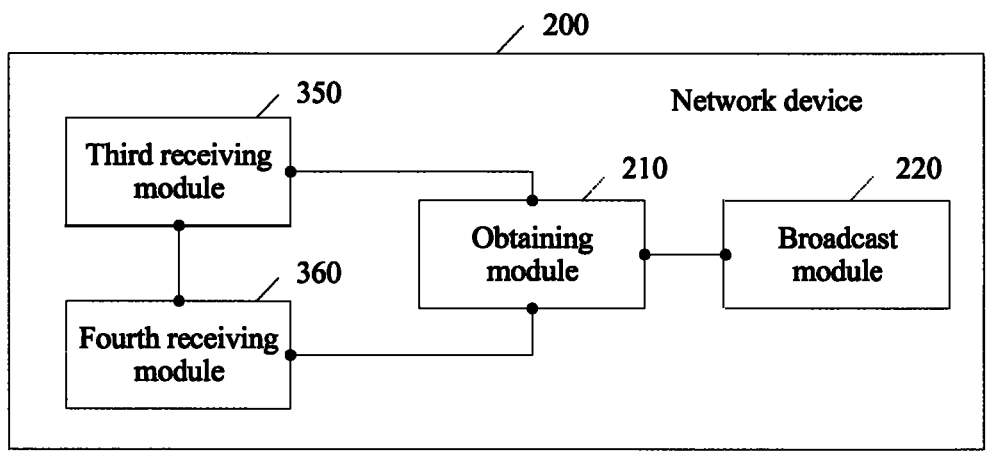
FIG. 3-f

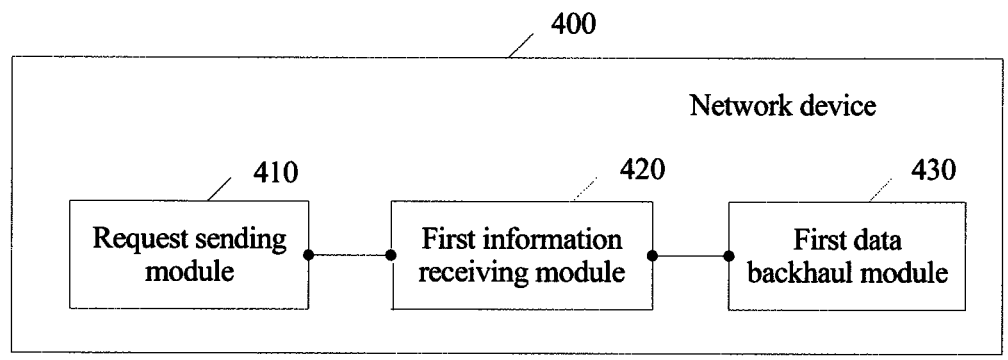
FIG. 4
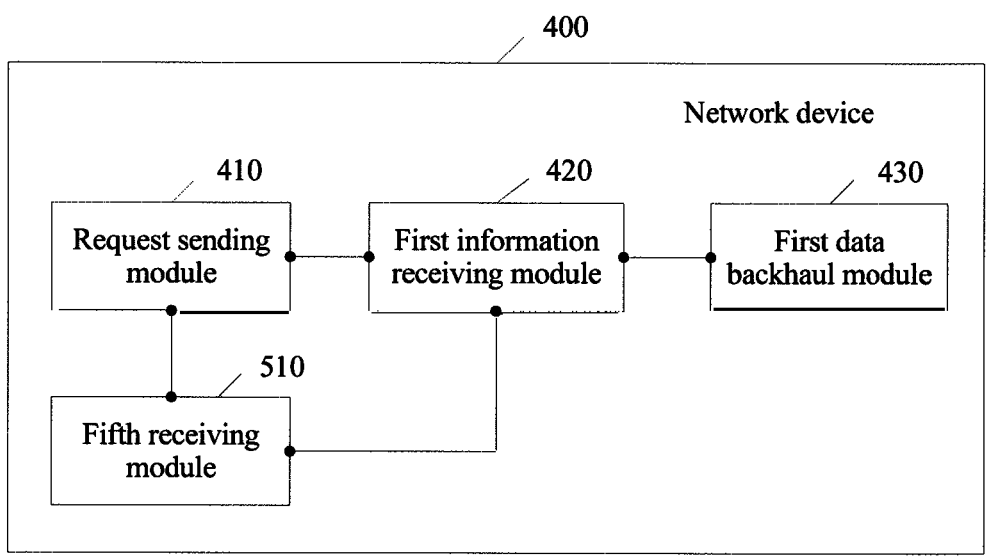
FIG. 5-a

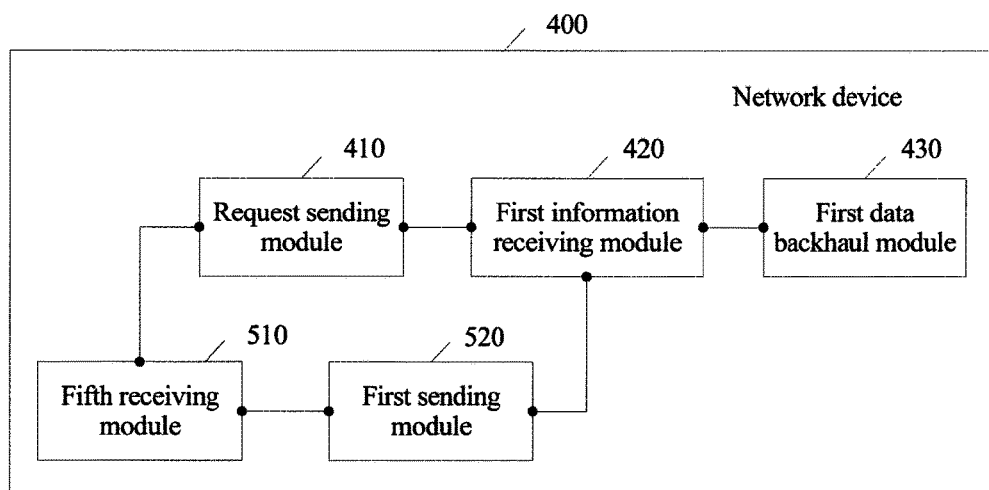
FIG. 5-b
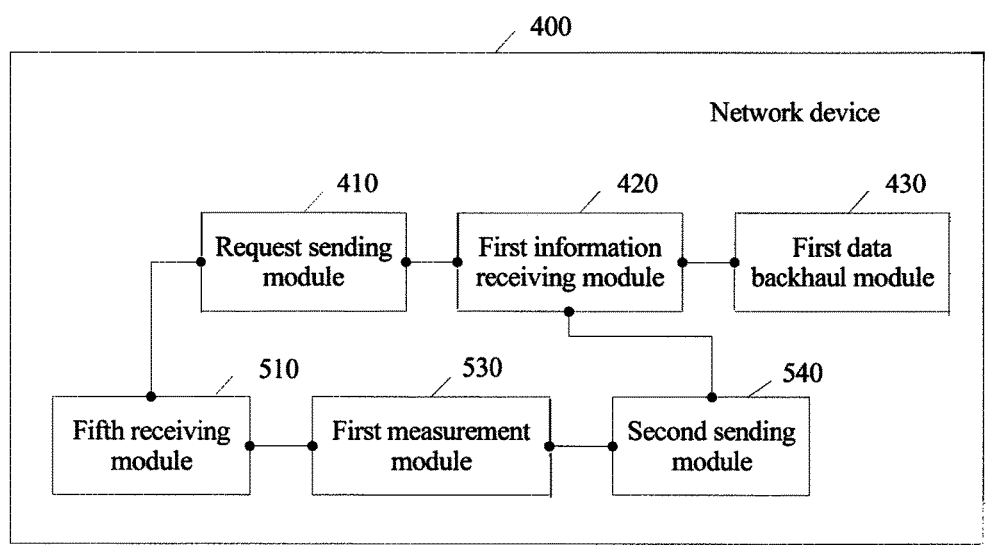
FIG. 5-c

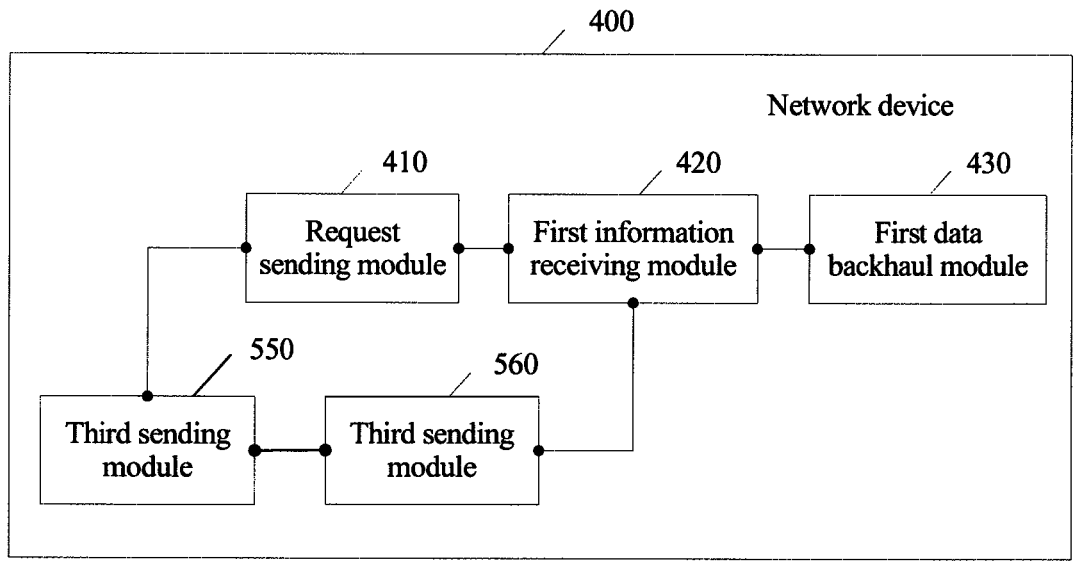
FIG. 5-d
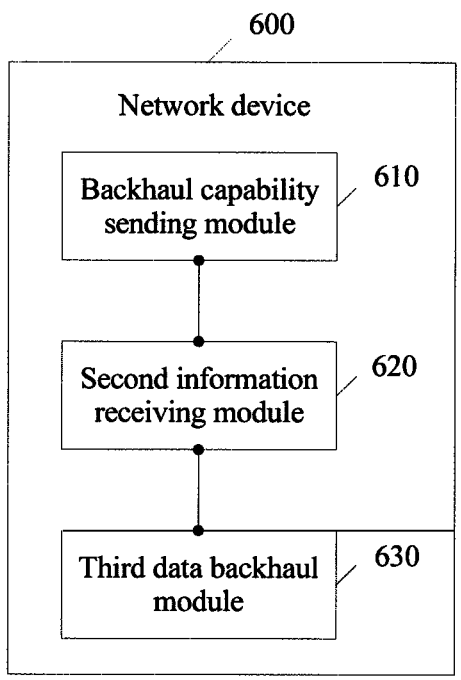
FIG. 6

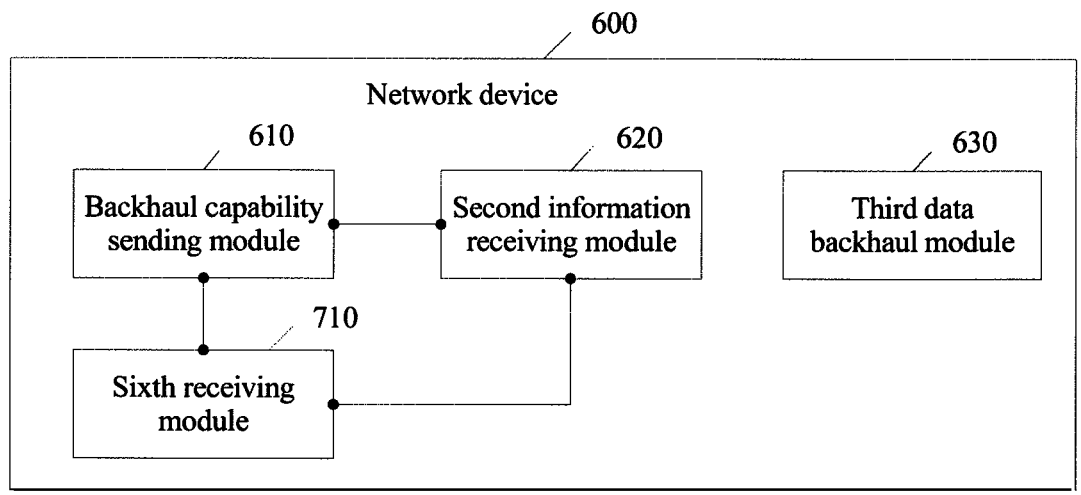
FIG. 7-a
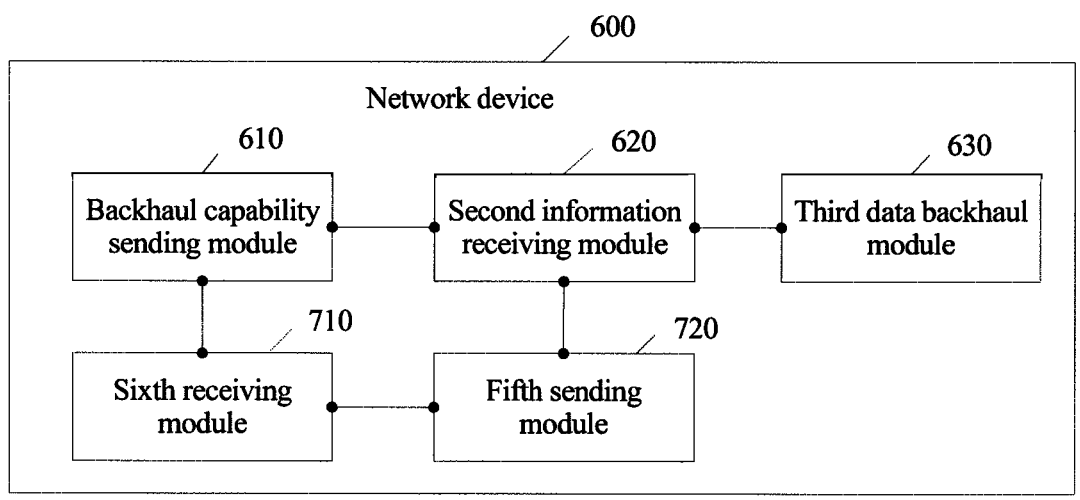
FIG. 7-b

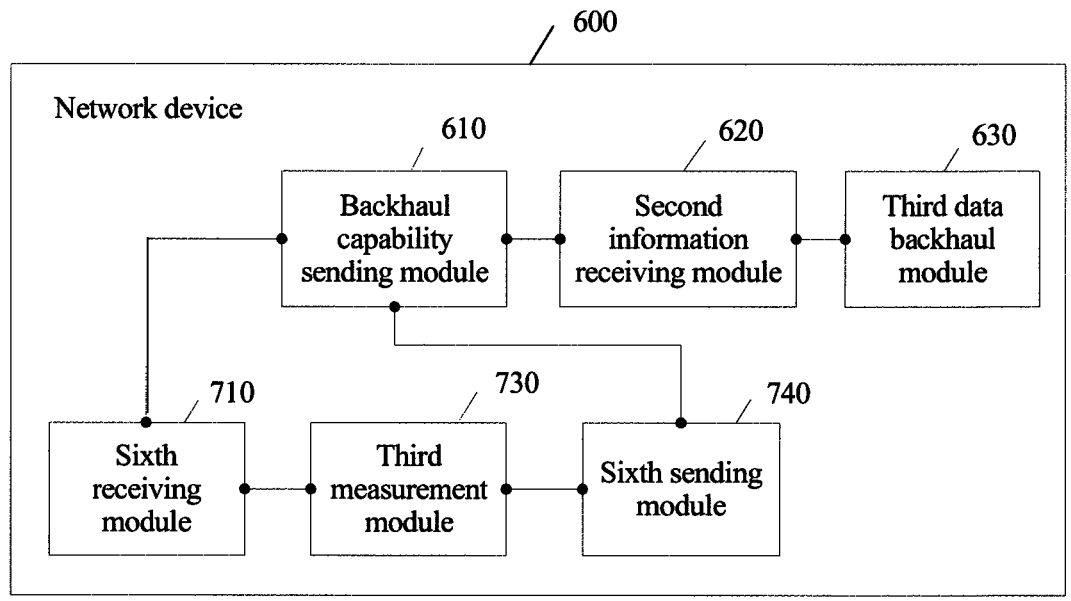
FIG. 7-c
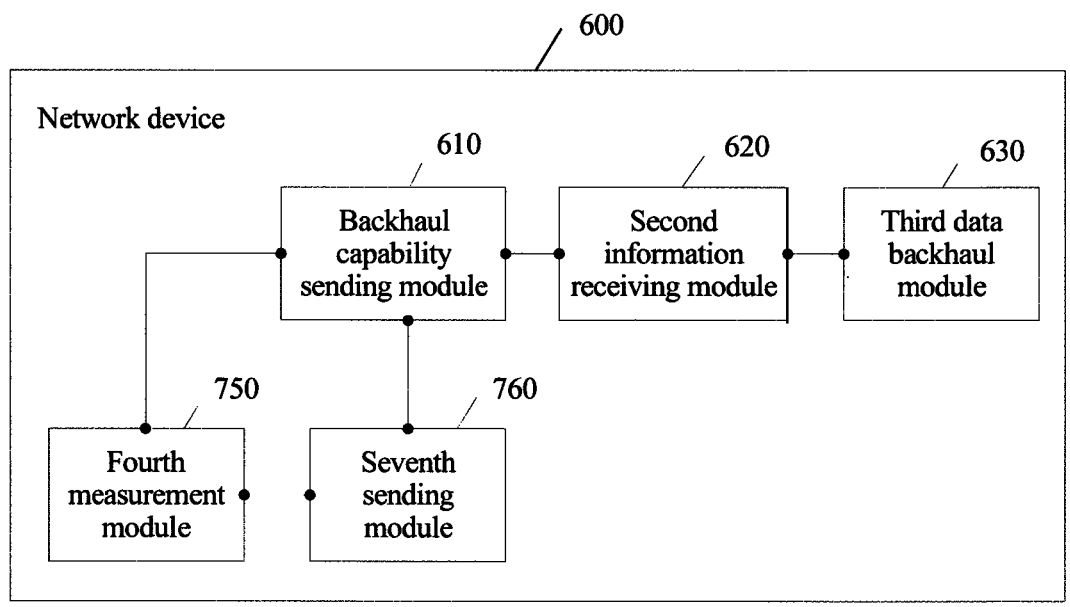
FIG. 7-d

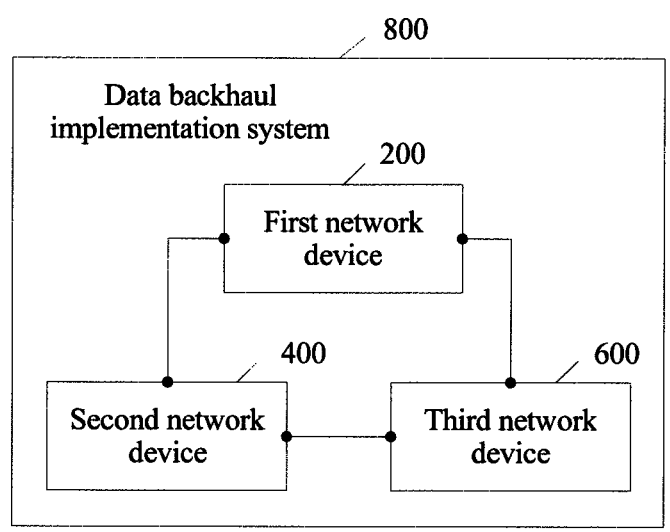
FIG. 8-a

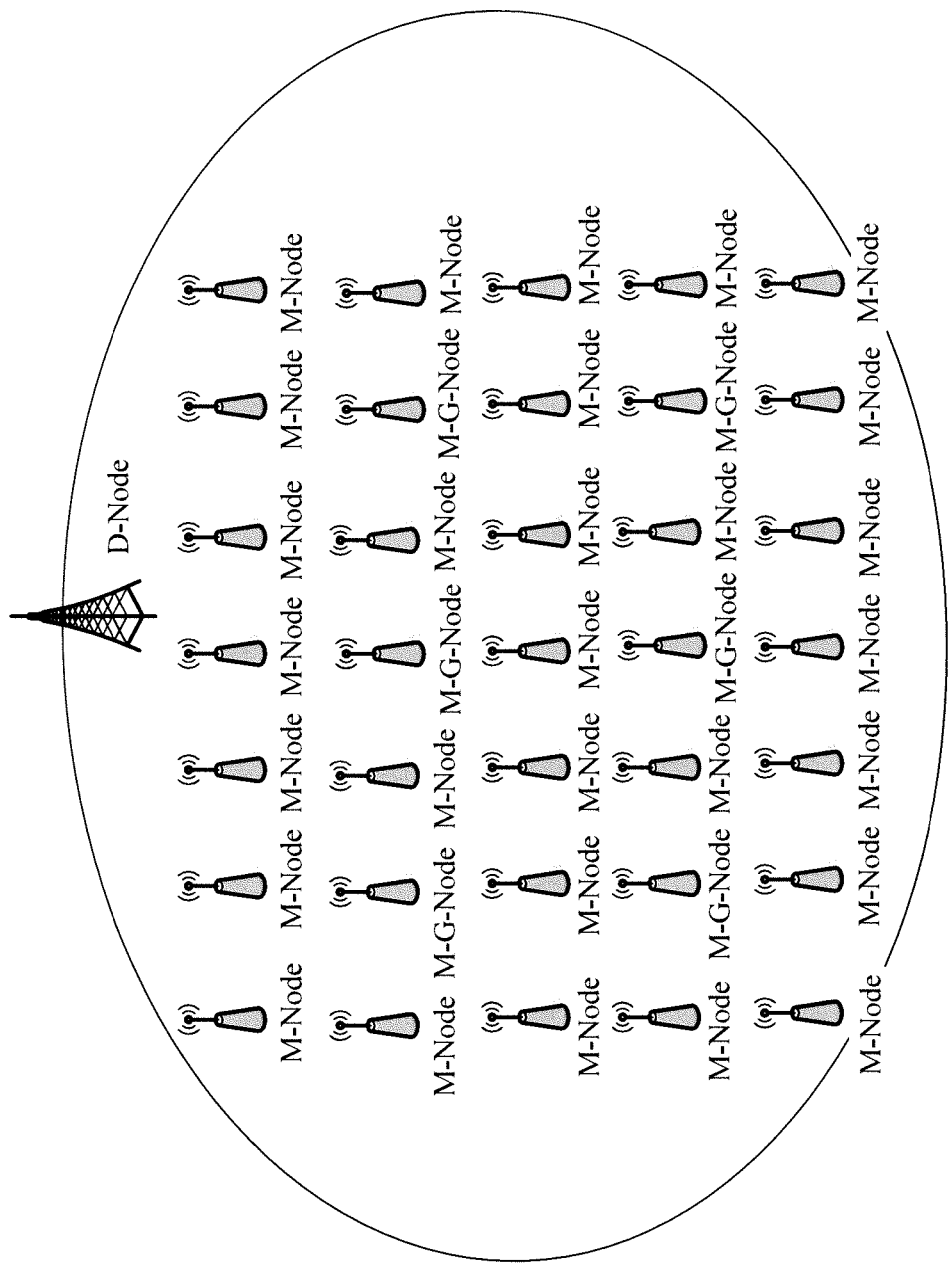
FIG. 8-b

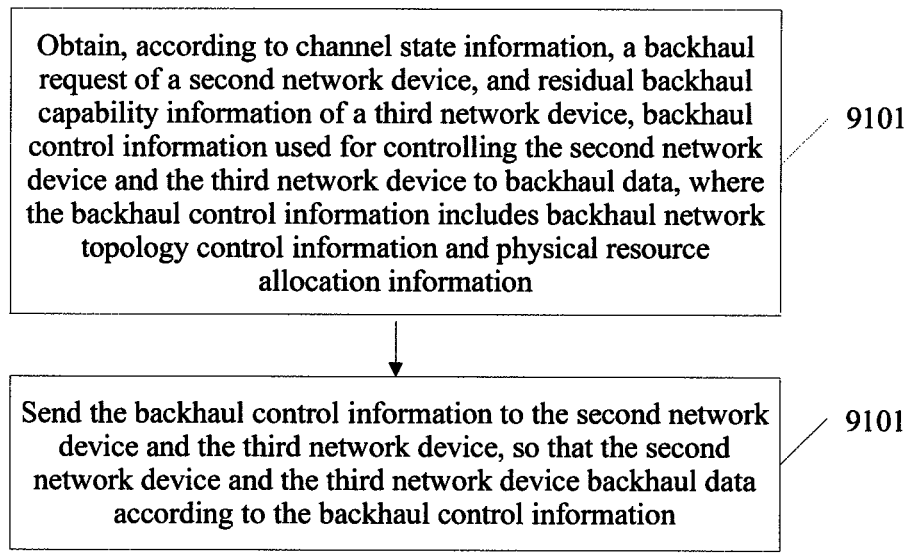
FIG. 9-a
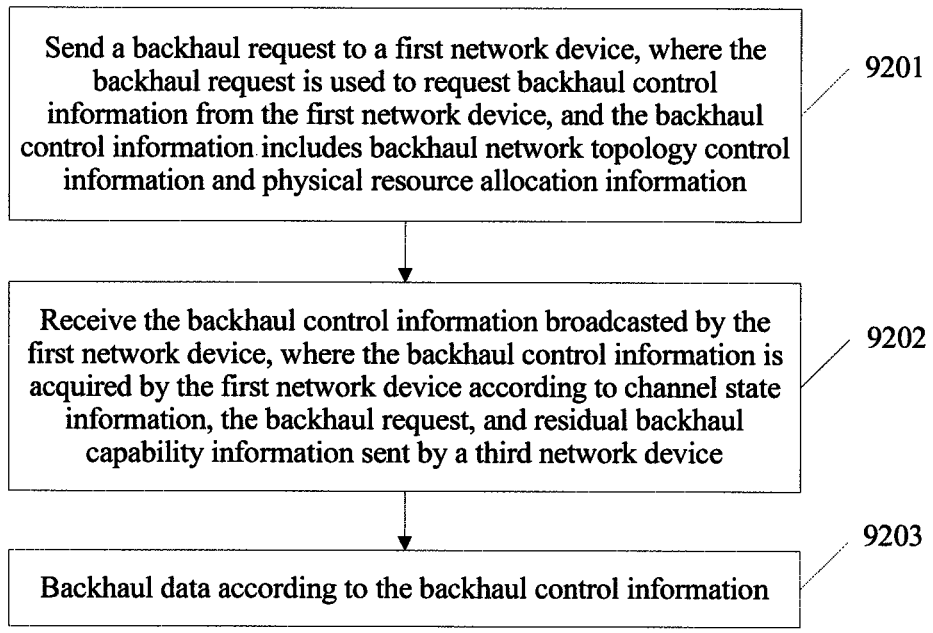
FIG. 9-b

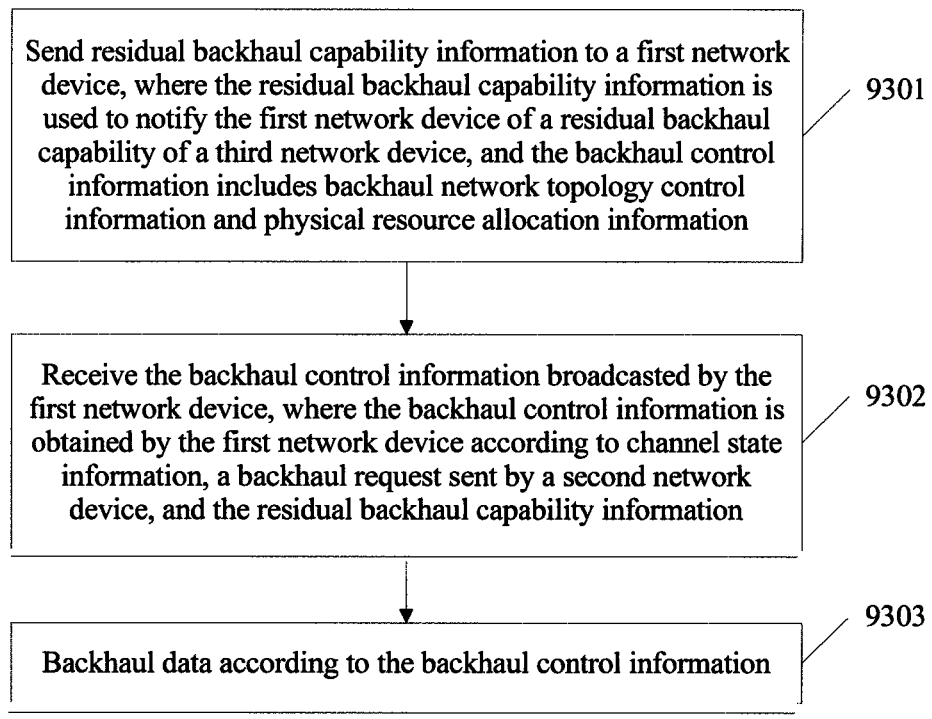
FIG. 9-c

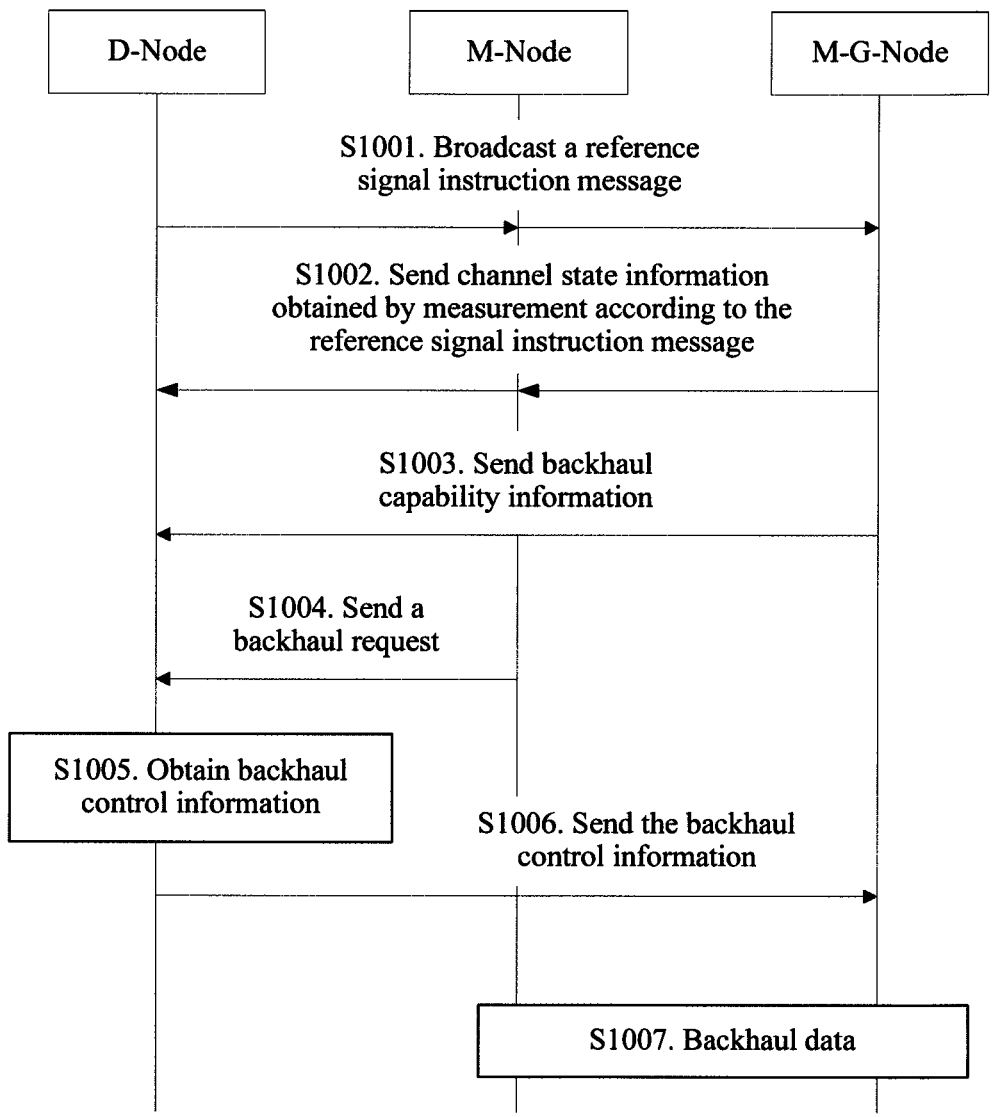
FIG. 10-a

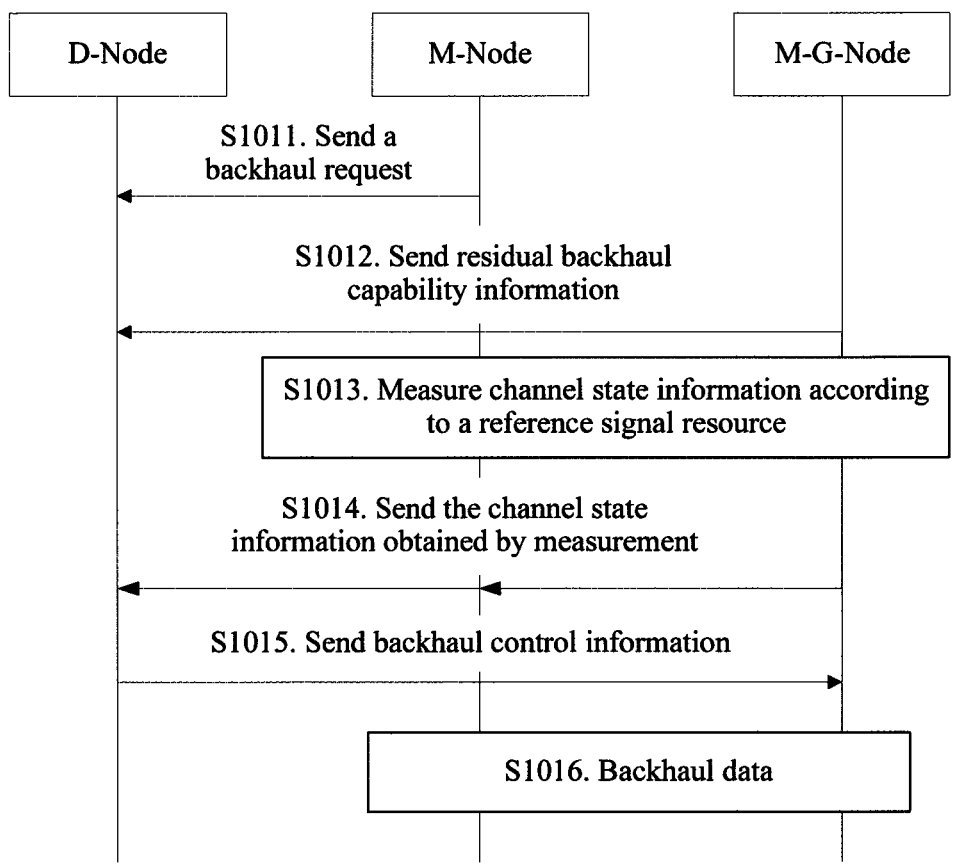
FIG. 10-b

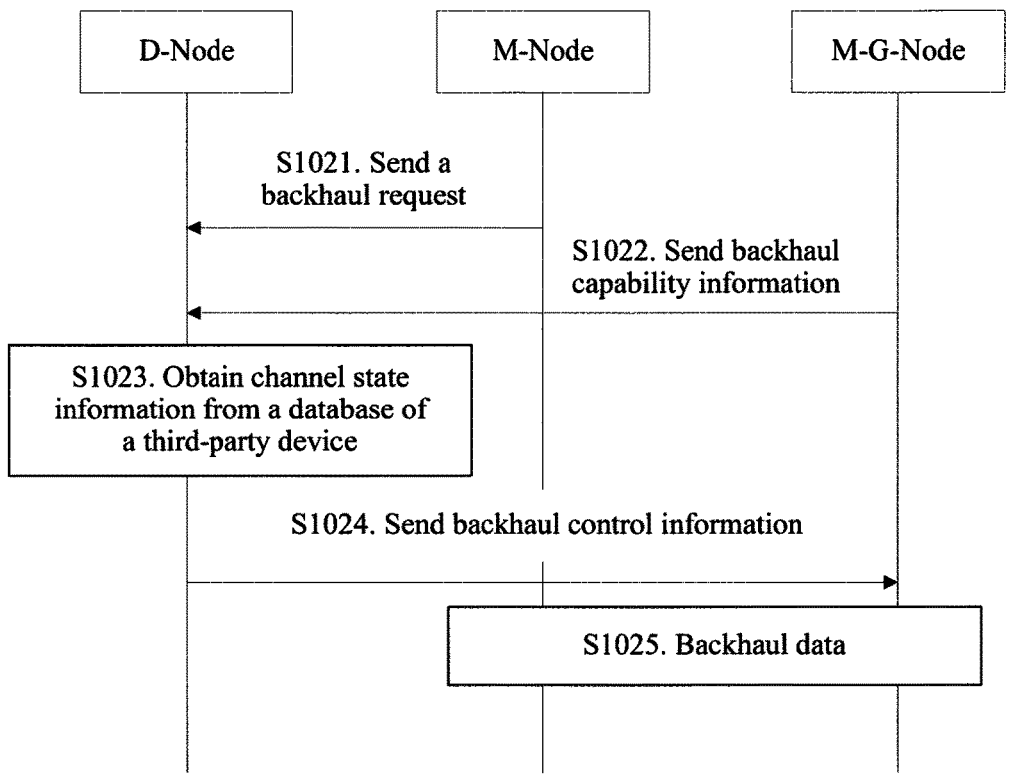
FIG. 10-c
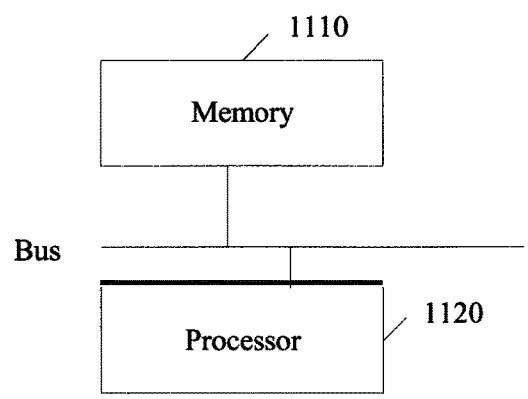
FIG. 11

NETWORK DEVICE AND DATA BACKHAUL IMPLEMENTATION SYSTEM AND METHOD

CROSS-REFERENCE TO RELATED APPLICATIONS

This application is a continuation of International Application No. PCT/CN2014/072558, filed on Feb. 26, 2014, which is hereby incorporated by reference in its entirety.

TECHNICAL FIELD

The present invention relates to the field of communications technologies, and specifically, to a network device and a data backhaul implementation system and method.

BACKGROUND

In a network evolution process of a Long Term Evolution (LTE for short) or Long Term Evolution Advanced (LTE-advanced, LTE-A for short) system of the 3$^{rd}$ Generation Partnership Project (3GPP for short), evolution from a homogeneous network to a heterogeneous network is presented. In the homogeneous network, high-power eNodeBs with a large coverage area form continuous coverage according to a cellular network shape. In the heterogeneous network, more micro eNodeB nodes are added in network coverage of an eNodeB (macro eNodeB) to further improve a network coverage capacity. In the heterogeneous network, although the network coverage capacity of the eNodeB can be improved by adding the micro eNodeB nodes, how to resolve data backhaul of numerous micro eNodeBs becomes one of critical problems that need to be resolved in the heterogeneous network.

The LTE standard supports a relay technology. A network mainly includes a donor node, a relay node (RN for short), and user equipment (UE for short). One end of the RN connects to the donor eNodeB, and the other end connects to the UE. The donor eNodeB is a common eNodeB that already connects to a core network. The RN is a station that can provide a wireless access service for the UE, and connects to the donor eNodeB by using a Un interface, thereby implementing data backhaul. However, the connection between the RN and the donor eNodeB is generally fixed and supports only a single-hop connection.

In a wireless mesh network (Wireless Mesh Network, WMN for short) technology in the 802.11s, as shown in FIG. 1, a station STA, an access point (AP for short), and a mesh point (MP for short) are included. The STA is equivalent to the UE in the LTE network, and the MP may form a mesh network with a neighboring MP. Because the wireless mesh network in FIG. 1 works in a distributed form and lacks a node for optimizing and managing the network, relatively poor network backhaul performance is caused.

SUMMARY

For the foregoing disadvantages, embodiments of the present invention provide a network device and a data backhaul implementation system and method, which can implement centralized and dynamic allocation of backhaul resources in a network and improve a data backhaul capacity of the entire network.

A first aspect of the present invention provides a network device, which may include:

an obtaining module, configured to obtain, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information; and a broadcast module, configured to broadcast the backhaul control information to the second network device and the third network device, so that the second network device and the third network device backhaul data according to the backhaul control information.

With reference to the first aspect, in a first possible implementation manner, the network device further includes:

a first broadcast module, configured to broadcast a reference signal instruction message to the second network device and the third network device, where the reference signal instruction message is used to instruct one or more network devices of the second network device or the third network device to send a reference signal and another network device to measure the channel state information.

With reference to the first possible implementation manner of the first aspect, in a second possible implementation manner, the network device further includes:

a first receiving module, configured to receive the channel state information sent by the second network device and the third network device, where the channel state information is obtained by the second network device and the third network device by performing measurement according to the reference signal instruction message, and the channel state information includes feedback parameters such as a precoding matrix indicator PMI, a channel quality indicator CQI, and a rank Rank.

With reference to the first aspect, in a third possible implementation manner, the network device further includes:

a second obtaining module, configured to obtain the channel state information by using a third-party database.

With reference to the first aspect, in a fourth possible implementation manner, the network device further includes:

a second receiving module, configured to receive the channel state information sent by the second network device and the third network device, where the channel state information is obtained by the second network device and the third network device by performing measurement according to a reference signal.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the network device further includes:

a third receiving module, configured to receive the backhaul request sent by the second network device, where the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the network device further includes:

a fourth receiving module, configured to receive the residual backhaul capability information sent by the third network device, where the residual backhaul capability information includes at least one of the following: a backhaul capability margin, a delay experienced during backhaul, a buffer area size, a backhaul charging method, a type of a network in which backhaul arrives, or a backhaul link reliability index.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner, the backhaul network topology control information in the backhaul control information includes at least one backhaul path, and the backhaul path is allocated to the second network device that sends the backhaul request; the physical resource allocation information in the backhaul control information includes a corresponding physical resource that can be used in the backhaul path when the backhaul path included in the backhaul network topology control information is used; and further, the broadcast module is specifically configured to send the backhaul control information to the second network device and the third network device, so that the second network device backhauls, by using the physical resource indicated by the physical resource allocation information, data in the backhaul path included in the backhaul network topology control information, and after receiving the backhaul control information, the third network device backhauls data according to the backhaul control information by using a backhaul capability of the third network device.

A second aspect of the present invention provides a network device, which may include:

a request sending module, configured to send a backhaul request to a first network device, where the backhaul request is used to request backhaul control information from the first network device, and the backhaul control information includes backhaul network topology control information and physical resource allocation information;

a first information receiving module, configured to receive the backhaul control information broadcasted by the first network device, where the backhaul control information is obtained by the first network device according to channel state information, the backhaul request, and residual backhaul capability information sent by a third network device; and a first data backhaul module, configured to backhaul data according to the backhaul control information.

With reference to the second aspect, in a first possible implementation manner, the network device further includes:

a fifth receiving module, configured to receive a reference signal instruction message broadcasted by the first network device, where the reference signal instruction message is used to instruct to send a reference signal or measure the channel state information.

With reference to the first possible implementation manner of the second aspect, in a second possible implementation manner, when the reference signal instruction message received by the fifth receiving module instructs to send a reference signal, the network device further includes:

a first sending module, configured to send the reference signal according to the reference signal instruction message; or when the reference signal instruction message received by the fifth receiving module instructs to measure the channel state information, the network device further includes:

a first measurement module, configured to measure feedback parameters such as a precoding matrix indicator PMI, a channel quality indicator CQI, and a rank Rank according to an instruction of the reference signal instruction message, to obtain the channel state information, where the channel state information includes the feedback parameters such as the PMI, the CQI, and the Rank; and a second sending module, configured to send the channel state information to the first network device.

With reference to the first aspect, in a third possible implementation manner, the network device further includes:

a second measurement module, configured to measure the channel state information according to a reference signal resource, where the reference signal resource includes a common reference signal CRS and a demodulation reference signal DMRS; and a third sending module, configured to send the channel state information obtained by the second measurement module by measurement to the first network device.

With reference to the second aspect, or the first possible implementation manner of the second aspect, or the second possible implementation manner of the second aspect, or the third possible implementation manner of the second aspect, in a fourth possible implementation manner, the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the backhaul network topology control information in the backhaul control information includes at least one backhaul path, and the backhaul path is allocated to a second network device that sends the backhaul request; the physical resource allocation information in the backhaul control information includes a corresponding physical resource that can be used in the backhaul path when the backhaul path included in the backhaul network topology control information is used; and further, the first data backhaul module is specifically configured to backhaul, by using the physical resource indicated by the physical resource allocation information, data in the backhaul path included in the backhaul network topology control information.

A third aspect of the present invention provides a network device, which may include:

a backhaul capability sending module, configured to send residual backhaul capability information to a first network device, where the residual backhaul capability information includes information about a backhaul capability that is left after data is backhauled according to a backhaul capability of the network device;

a second information receiving module, configured to receive backhaul control information broadcasted by the first network device, where the backhaul control information is obtained by the first network device according to channel state information, a backhaul request sent by a second network device, and the residual backhaul capability information, and the backhaul control information includes backhaul network topology control information and physical resource allocation information; and a third data backhaul module, configured to backhaul data according to the backhaul control information.

With reference to the third aspect, in a first possible implementation manner, the network device further includes:

a sixth receiving module, configured to receive a reference signal instruction message broadcasted by the first network device, where the reference signal instruction message is used to instruct to send a reference signal or measure the channel state information.

With reference to the first possible implementation manner of the third aspect, in a second possible implementation manner, when the reference signal instruction message received by the sixth receiving module instructs to send a reference signal, the network device further includes:

a fifth sending module, configured to send the reference signal according to the reference signal instruction message; or when the reference signal instruction message received by the sixth receiving module instructs to measure the channel state information, the network device further includes:

a third measurement module, configured to measure feedback parameters such as a precoding matrix indicator PMI, a channel quality indicator CQI, and a rank Rank according to an instruction of the reference signal instruction message, to obtain the channel state information, where the channel state information includes the feedback parameters such as the PMI, the CQI, and the Rank; and a sixth sending module, configured to send the channel state information to the first network device.

With reference to the third aspect, in a third possible implementation manner, the network device further includes:

a fourth measurement module, configured to measure the channel state information according to a reference signal resource, where the reference signal includes a common reference signal CRS and a demodulation reference signal DMRS; and a seventh sending module, configured to send the channel state information obtained by the fourth measurement module by measurement to the first network device.

With reference to the third aspect, or the first possible implementation manner of the third aspect, or the second possible implementation manner of the third aspect, or the third possible implementation manner of the third aspect, in a fourth possible implementation manner, the residual backhaul capability information includes at least one of the following: a backhaul capability margin, a delay experienced during backhaul, a buffer area size, a backhaul charging method, a type of a network in which backhaul arrives, or a backhaul link reliability index.

A fourth aspect of the present invention provides a data backhaul implementation system, which may include: a first network device, a second network device, and a third network device, where the first network device is configured to: obtain, according to channel state information, a backhaul request of the second network device, and residual backhaul capability information of the third network device, backhaul control information used for controlling the second network device and the third network device to backhaul data; and broadcast the backhaul control information to the second network device and the third network device, so that the second network device and the third network device backhaul data according to the backhaul control information;

the second network device is configured to: send the backhaul request to the first network device, where the backhaul request is used to request the backhaul control information from the first network device; and receive the backhaul control information broadcasted by the first network device, and backhaul data according to the backhaul control information; and the third network device is configured to: send the residual backhaul capability information to the first network device, where the residual backhaul capability information includes information about a backhaul capability that is left after data is backhauled according to a backhaul capability of the third network device; and receive the backhaul control information sent by the first network device, and backhaul data according to the backhaul control information; where the backhaul control information includes backhaul network topology control information and physical resource allocation information.

With reference to the fourth aspect, in a first possible implementation manner, the first network device is further configured to broadcast a reference signal instruction message to the second network device and the third network device, where the reference signal instruction message is used to instruct one or more network devices of the second network device or the third network device to send a reference signal and another network device to measure the channel state information.

With reference to the first possible implementation manner of the fourth aspect, in a second possible implementation manner, the first network device is further configured to receive the channel state information sent by the second network device and the third network device, where the channel state information is obtained by the second network device and the third network device by performing measurement according to the reference signal instruction message, and the channel state information includes feedback parameters such as a precoding matrix indicator PMI, a channel quality indicator CQI, and a Rank With reference to the fourth aspect, in a third possible implementation manner, the first network device is further configured to obtain the channel state information by using a third-party database.

With reference to the fourth aspect, in a fourth possible implementation manner, the first network device is further configured to receive the channel state information sent by the second network device and the third network device, where the channel state information is obtained by the second network device and the third network device by performing measurement according to a reference signal resource, and the reference signal resource includes a common reference signal CRS and a demodulation reference signal DMRS.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner, the first network device is further configured to receive the backhaul request sent by the second network device, where the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner, the first network device is further configured to receive the residual backhaul capability information sent by the third network device, where the residual backhaul capability information includes at least one of the following: a backhaul capability margin, a delay experienced during backhaul, a buffer area size, a backhaul charging method, a type of a network in which backhaul arrives, or a backhaul link reliability index.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, in a seventh possible implementation manner of the fourth aspect, the backhaul network topology control information in the backhaul control information includes at least one backhaul path, and the backhaul path is allocated to the second network device that sends the backhaul request; the physical resource allocation information in the backhaul control information includes a corresponding physical resource that can be used in the backhaul path when the backhaul path included in the backhaul network topology control information is used; and further, the second network device is specifically configured to backhaul, by using the physical resource indicated by the physical resource allocation information, data in the backhaul path included in the backhaul network topology control information.

A fifth aspect of the present invention provides a data backhaul implementation method, which may include:

obtaining, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information; and sending the backhaul control information to the second network device and the third network device, so that the second network device and the third network device backhaul data according to the backhaul control information.

With reference to the fifth aspect, in a first possible implementation manner, before the obtaining backhaul control information used for controlling the second network device and the third network device to backhaul data, the method includes the following step:

broadcasting a reference signal instruction message to the second network device and the third network device, where the reference signal instruction message is used to instruct one or more network devices of the second network device or the third network device to send a reference signal and another network device to measure the channel state information.

With reference to the first possible implementation manner of the fifth aspect, in a second possible implementation manner, after the broadcasting a reference signal instruction message to the second network device and the third network device, the method includes the following step:

receiving the channel state information sent by the second network device and the third network device, where the channel state information is obtained by the second network device and the third network device by performing measurement according to the reference signal instruction message, and the channel state information includes a precoding matrix indicator PMI, a channel quality indicator CQI, and a rank Rank.

With reference to the fifth aspect, in a third possible implementation manner, before the obtaining backhaul control information used for controlling the second network device and the third network device to backhaul data, the method includes the following step:

obtaining the channel state information by using a third-party database.

With reference to the fifth aspect, in a fourth possible implementation manner, before the obtaining backhaul control information used for controlling the second network device and the third network device to backhaul data, the method includes the following step:

receiving the channel state information sent by the second network device and the third network device, where the channel state information is obtained by the second network device and the third network device by performing measurement according to a reference signal resource, and the reference signal resource includes a common reference signal CRS and a demodulation reference signal DMRS.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, in a fifth possible implementation manner, before the obtaining backhaul control information used for controlling the second network device and the third network device to backhaul data, the method includes the following step:

receiving the backhaul request sent by the second network device, where the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner, before the obtaining backhaul control information used for controlling the second network device and the third network device to backhaul data, the method includes the following step:

receiving the residual backhaul capability information sent by the third network device, where the residual backhaul capability information includes at least one of the following: a backhaul capability margin, a delay experienced during backhaul, a buffer area size, a backhaul charging method, a type of a network in which backhaul arrives, or a backhaul link reliability index.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, or with reference to the sixth possible implementation manner of the fifth aspect, in a seventh possible implementation manner, the backhaul network topology control information in the backhaul control information includes at least one backhaul path, and the backhaul path is allocated to the second network device that sends the backhaul request; the physical resource allocation information in the backhaul control information includes a corresponding physical resource that can be used in the backhaul path when the backhaul path included in the backhaul network topology control information is used; and further, that the second network device and the third network device backhaul data according to the backhaul control information includes:

the second network device backhauls, by using the physical resource indicated by the physical resource allocation information, data in the backhaul path comprised in the backhaul network topology control information, and the third network device backhauls data according to the backhaul control information by using a backhaul capability of the third network device.

A sixth aspect of the present invention provides a data backhaul implementation method, which may include:

sending a backhaul request to a first network device, where the backhaul request is used to request backhaul control information from the first network device, and the backhaul control information includes backhaul network topology control information and physical resource allocation information;

receiving the backhaul control information broadcasted by the first network device, where the backhaul control information is obtained by the first network device according to channel state information, the backhaul request, and residual backhaul capability information sent by a third network device; and backhauling data according to the backhaul control information.

With reference to the sixth aspect, in a first possible implementation manner, before the receiving the backhaul control information broadcasted by the first network device, the method includes:

receiving a reference signal instruction message broadcasted by the first network device, where the reference signal instruction message is used to instruct to send a reference signal or measure the channel state information.

With reference to the first possible implementation manner of the sixth aspect, in a second possible implementation manner, after the receiving a reference signal instruction message broadcasted by the first network device, the method includes:

if the received reference signal instruction message instructs to send a reference signal, sending the reference signal according to the reference signal instruction message; or if the received reference signal instruction message instructs to measure the channel state information, measuring feedback parameters such as a precoding matrix indicator PMI, a channel quality indicator CQI, and a rank Rank according to an instruction of the reference signal instruction message, to obtain the channel state information; and sending the channel state information obtained by measurement to the first network device, where the channel state information includes the feedback parameters such as the PMI, the CQI, and the Rank.

With reference to the sixth aspect, in a third possible implementation manner, before the receiving the backhaul control information broadcasted by the first network device, the method includes:

measuring the channel state information according to a reference signal resource, and sending the channel state information to the first network device, where the reference signal resource includes a common reference signal CRS and a demodulation reference signal DMRS.

With reference to the sixth aspect, or the first possible implementation manner of the sixth aspect, or the second possible implementation manner of the sixth aspect, or the third possible implementation manner of the sixth aspect, in a fourth possible implementation manner, the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

With reference to the sixth aspect, or the first possible implementation manner of the sixth aspect, or the second possible implementation manner of the sixth aspect, or the third possible implementation manner of the sixth aspect, or with reference to the fourth possible implementation manner of the sixth aspect, in a fifth possible implementation manner, the backhaul network topology control information in the backhaul control information includes at least one backhaul path, and the backhaul path is allocated to a second network device that sends the backhaul request; the physical resource allocation information in the backhaul control information includes a corresponding physical resource that can be used in the backhaul path when the backhaul path included in the backhaul network topology control information is used; and further, the backhauling data according to the backhaul control information includes:

backhauling, by using the physical resource indicated by the physical resource allocation information, data in the backhaul path included in the backhaul network topology control information.

A seventh aspect of the present invention provides a data backhaul implementation method, which may include:

sending residual backhaul capability information to a first network device, where the residual backhaul capability information is used to notify the first network device of a residual backhaul capability of a third network device, and the backhaul control information includes backhaul network topology control information and physical resource allocation information;

receiving backhaul control information broadcasted by the first network device, where the backhaul control information is obtained by the first network device according to channel state information, a backhaul request sent by a second network device, and the residual backhaul capability information; and backhauling data according to the backhaul control information.

With reference to the seventh aspect, in a first possible implementation manner, before the receiving backhaul control information broadcasted by the first network device, the method includes:

receiving a reference signal instruction message broadcasted by the first network device, where the reference signal instruction message is used to instruct to send a reference signal or measure the channel state information.

With reference to the first possible implementation manner of the seventh aspect, in a second possible implementation manner, after the receiving a reference signal instruction message broadcasted by the first network device, the method includes:

if the received reference signal instruction message instructs to send a reference signal, sending the reference signal according to the reference signal instruction message; or if the received reference signal instruction message instructs to measure the channel state information, measuring feedback parameters such as a precoding matrix indicator PMI, a channel quality indicator CQI, and a rank Rank according to an instruction of the reference signal instruction message, to obtain the channel state information; and sending the channel state information obtained by measurement to the first network device, where the channel state information includes the feedback parameters such as the PMI, the CQI, and the Rank.

With reference to the seventh aspect, in a third possible implementation manner, before the receiving backhaul control information broadcasted by the first network device, the method includes:

measuring the channel state information according to a reference signal resource, and sending the channel state information to the first network device, where the reference signal resource includes a common reference signal CRS and a demodulation reference signal DMRS.

With reference to the seventh aspect, or the first possible implementation manner of the seventh aspect, or the second possible implementation manner of the seventh aspect, or the third possible implementation manner of the seventh aspect, in a fourth possible implementation manner, the residual backhaul capability information includes at least one of the following: a backhaul capability margin, a delay experienced during backhaul, a buffer area size, a backhaul charging method, a type of a network in which backhaul arrives, or a backhaul link reliability index.

It can be learned from the foregoing technical solutions that, the embodiments of the present invention have the following advantages:

In the embodiments of the present invention, a second network device sends a backhaul request to a first network device to request the first network device to send backhaul control information for backhauling data, and a third network device sends residual backhaul capability information to the first network device to notify the first network device of an available residual backhaul capability. Therefore, the first network device can obtain, according to the backhaul request sent by the second network device, the residual backhaul capability information sent by the third network device, and channel state information of a network, the backhaul control information used for controlling the second network device and the third network device to backhaul data. In comparison with the prior art, in the embodiments of the present invention, the first network device can manage the second network device and the third network device in a centralized manner, thereby implementing centralized allocation of backhaul resources to the second network device and the third network device and improving a data backhaul capacity of the entire network.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3-a is a basic schematic structural diagram of a network device according to another embodiment of the present invention;

FIG. 3-b is a basic schematic structural diagram of a network device according to another embodiment of the present invention;

FIG. 3-c is a basic schematic structural diagram of a network device according to another embodiment of the present invention;

FIG. 3-d is a basic schematic structural diagram of a network device according to another embodiment of the present invention;

FIG. 3-e is a basic schematic structural diagram of a network device according to another embodiment of the present invention;

FIG. 3-f is a basic schematic structural diagram of a network device according to another embodiment of the present invention;

FIG. 4 is a basic schematic structural diagram of a network device according to an embodiment of the present invention;

FIG. 5-a is a basic schematic structural diagram of a network device according to another embodiment of the present invention;

FIG. 5-b is a basic schematic structural diagram of a network device according to another embodiment of the present invention;

FIG. 5-c is a basic schematic structural diagram of a network device according to another embodiment of the present invention;

FIG. 5-d is a basic schematic structural diagram of a network device according to another embodiment of the present invention;

FIG. 6 is a basic schematic structural diagram of a network device according to an embodiment of the present invention;

FIG. 7-a is a basic schematic structural diagram of a network device according to another embodiment of the present invention;

FIG. 7-b is a basic schematic structural diagram of a network device according to another embodiment of the present invention;

FIG. 7-c is a basic schematic structural diagram of a network device according to another embodiment of the present invention;

FIG. 7-d is a basic schematic structural diagram of a network device according to another embodiment of the present invention;

FIG. 8-a is a basic schematic structural diagram of a data backhaul implementation system according to an embodiment of the present invention;

FIG. 8-b is a layout diagram of a data backhaul implementation system according to an embodiment of the present invention;

FIG. 9-*a* is a schematic flowchart of a data backhaul implementation method according to an embodiment of the present invention;

FIG. 9-*b* is a schematic flowchart of a data backhaul implementation method according to an embodiment of the present invention;

FIG. 9-*c* is a schematic flowchart of a data backhaul implementation method according to an embodiment of the present invention;

FIG. 10-*a* is a schematic flowchart of a data backhaul implementation method according to another embodiment of the present invention;

FIG. 10-*b* is a schematic flowchart of a data backhaul implementation method according to another embodiment of the present invention;

FIG. 10-*c* is a schematic flowchart of a data backhaul implementation method according to another embodiment of the present invention; and FIG. 11 is a schematic structural diagram of a data backhaul implementation device according to an embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a network device and a data backhaul implementation system and method, which are used to allocate backhaul resources in a network in a centralized and dynamic manner and improve a data backhaul capacity of the entire network.

Figure 1:
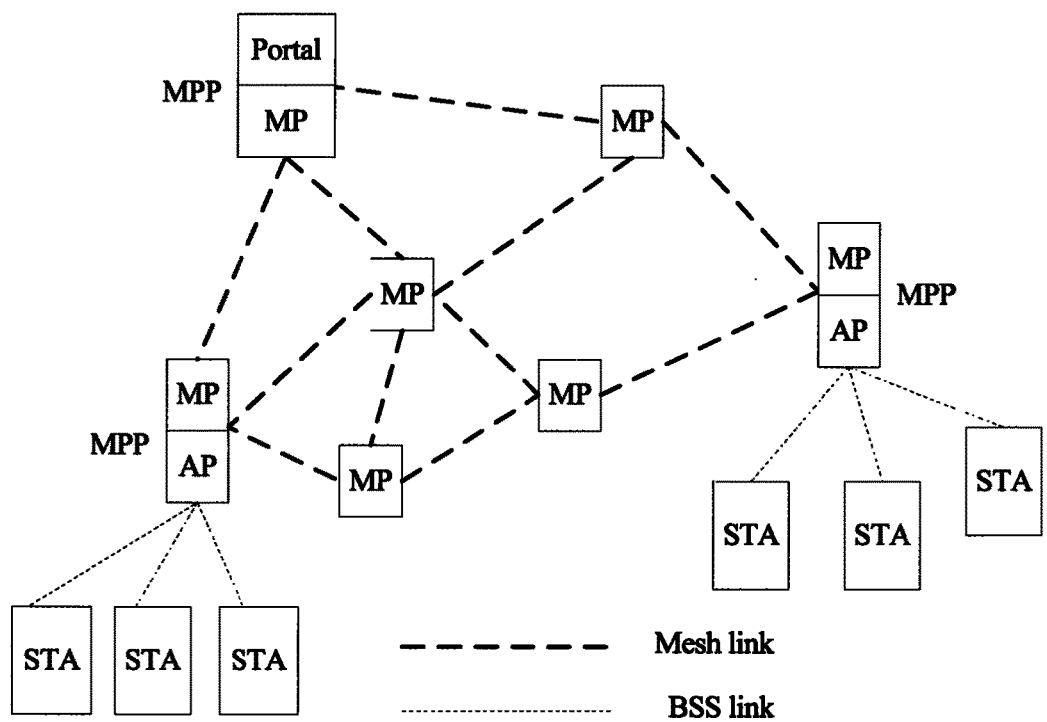
FIG. 1 is a layout diagram of a WMN in the prior art.
Figure 2:
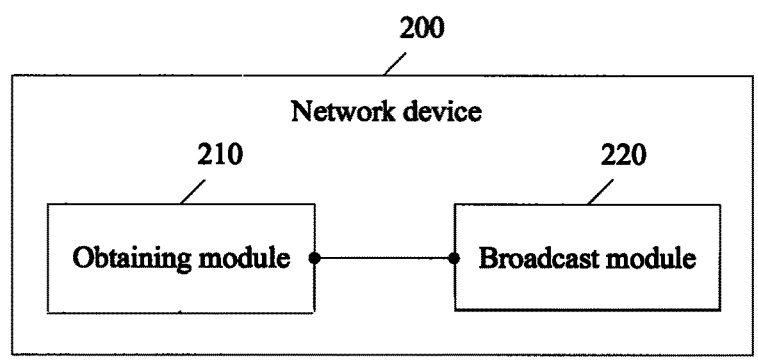
FIG. 2 is a basic schematic structural diagram of a network device according to an embodiment of the present invention.

As shown in FIG. 2, an embodiment of the present invention provides a network device 200, which may include:

an obtaining module 210, configured to obtain, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information; and a broadcast module 220, configured to broadcast the backhaul control information to the second network device and the third network device, so that the second network device and the third network device backhaul data according to the backhaul control information.

The obtaining module 210 obtains, according to the channel state information, the backhaul request of the second network device, and the residual backhaul capability information of the third network device, the backhaul control information used for controlling the second network device and the third network device to backhaul data, where the backhaul control information includes the backhaul network topology control information and the physical resource allocation information; the broadcast module 220 sends the obtained backhaul control information to the second network device and the third network device, so that the second network device and the third network device can backhaul data according to the backhaul control information. Therefore, centralized control of data backhaul of the second network device and the third network device is implemented, and a capacity of an entire backhaul network is improved.

In an LTE network, three types of nodes are specifically defined:

D-Node (Donor Node), which is a macro node having a relatively large coverage capability and has a capability of connecting to a core network;

M-Node (Mesh Node), which can implement wireless communication with a D-Node on at least one carrier and can implement wireless communication with a neighboring M-Node on at least one carrier; and M-G-Node (Mesh-Gateway Node), which is a node combining functions of an M-Node and a G-Node (Gateway Node), where the G-Node has a capability of directly performing backhaul with a core network in addition to performing backhaul by using a D-Node, and therefore, the M-G-Node not only can implement wireless communication with the D-Node on at least one carrier and can implement wireless communication with a neighboring M-Node on at least one carrier, but also has a capability of directly performing backhaul with a core network in addition to performing backhaul by using a D-Node.

A coverage network of the D-Node includes at least one M-Node and at least one M-G-Node.

Specifically, the network device 200 provided in this embodiment of the present invention is the D-Node in the LTE network, the second network device is the M-Node, and the third network device is the M-G-Node. Preferably, the D-Node may be specifically an eNodeB; the M-Node and the M-G-Node may be specifically eNodeBs or may be UE that can provide access to another terminal device or UE that has a specific backhaul capability.

The following further describes this embodiment of the present invention in detail, where this embodiment of the present invention specifically provides three manners of obtaining channel state information of a network. Certainly, a person skilled in the art may understand that the channel state information of the network may also be obtained in another manner, and no limitation is imposed thereto herein.

Manner 1: As shown in FIG. 3-*a*, the network device 200 may further include:

a first broadcast module 310, configured to broadcast a reference signal instruction message to the second network device and the third network device, where the reference signal instruction message is used to instruct one or more network devices of the second network device or the third network device to send a reference signal and another network device to measure the channel state information.

The network device 200 is configured to control the second network device and the third network device in a centralized manner and send, to the second network device and the third network device, the backhaul control information used to control data backhaul. The backhaul control information is obtained by the obtaining module 210 of the network device 200 according to the channel state information sent by the second network device and the third network device, the backhaul request sent by the second network device, and the residual backhaul capability information of the third network device. The channel state information of the network changes dynamically. The second network device and the third network device in the network are controlled by the network device 200 in a centralized manner. Therefore, before the obtaining module 210 obtains the backhaul control information, the first broadcast module 310 of the network device 200 broadcasts the reference signal instruction message to the second network device and the third network device in the network, where the reference signal instruction message is specifically used to instruct one or more of the second network device or the third network device to send a reference signal and another network device to measure a channel state. Another second network device and third network device that are not instructed by the reference signal instruction message to send a reference signal need to measure the channel state information on a resource corresponding to the reference signal instruction message.

Optionally, the reference signal may specifically include a channel state indication reference signal CSI-RS (Cell-Specific Channel State Indication Reference Signal, CSI-RS for short), and/or a channel state interference measurement reference signal (Cell-Specific Channel State Indication Interference Measurement, CSI-IM for short), or the like.

It is assumed that the network has second network devices 2A, 2B, 2C, and 2D and third network devices 3A, 3B, 3C, and 3D, and one or more of the second network devices or the third network devices may be specifically understood as the following situations:

S1. any one or more of 2A, 2B, 2C, 2D, 3A, 3B, 3C, or 3D;

S2. any one or more of 2A, 2B, 2C, or 2D;

S3. any one or more of 3A, 3B, 3C, or 3D;

S4. any one or more of 2A, 2B, 2C, or 2D, and any one or more of 3A, 3B, 3C, or 3D.

Specifically, after the second network device and the third network device receive the reference signal instruction message broadcasted by the network device 200, if the reference signal instruction message instructs to send a reference signal, the reference signal instruction message carries a resource for sending the reference signal, so that the reference signal is sent on the resource indicated by the reference signal instruction message; if the reference signal instruction message does not instruct to send a reference signal, feedback parameters such as a precoding matrix indicator (PMI for short), a channel quality indicator (CQI for short), and a rank are measured according to an instruction of the reference signal instruction message, to obtain the channel state information, and the obtained channel state information is sent to the network device 200.

Therefore, according to the foregoing description, as shown in FIG. 3-b, the network device 200 further includes a first receiving module 320, configured to receive the channel state information sent by the second network device and the third network device, where the channel state information includes the feedback parameters such as the PMI, the CQI, and the Rank.

The M-Node and the M-G-Node measure the channel state information under the instruction of the reference signal instruction message according to the reference signal instruction message broadcasted by the network device 200, where the feedback parameters such as the PMI, the CQI, and the Rank are mainly measured. Therefore, the channel state information obtained by measurement includes the PMI, the CQI, the Rank, and the like.

Manner 2: As shown in FIG. 3-c, the network device 200 further includes:

a second obtaining module 330, configured to obtain the channel state information by using a third-party database.

The network device 200 sends the reference signal instruction message to the second network device and the third network device, so that the second network device and the third network device measure the channel state information according to the reference signal instruction message. In addition, the network device 200 may also directly obtain the channel state information from another third-party database. The third-party database refers to a database of the channel state information obtained in the foregoing manner of measurement and feedback, or another manner, for example, a database of channel state information generated according to a mathematical model by using known geographical location information, or a database formed by performing measurement by another device and saving a measurement result.

Manner 3: In a case in which the network device 200 does not need to separately send a reference signal instruction message used for measuring the channel state information, the second network device and the third network device perform measurement according to another reference signal resource such as a common reference signal (Cell-Specific Reference Signals, CRS for short) or a demodulation reference signal (UE-Specific Reference Signals, DMRS for short), and then send the channel state information to the first network device. Therefore, as shown in FIG. 3-d, the network device 200 further includes:

a second receiving module 340, configured to receive the channel state information sent by the second network device and the third network device, where the channel state information is obtained by the second network device and the third network device by performing measurement according to a reference signal resource, and the reference signal resource includes a common reference signal CRS and a demodulation reference signal DMRS.

The second network device does not have a capability of connecting to the core network, and when backhauling data, sends the backhaul request to the network device 200 to request the network device 200 to allocate a backhaul resource to backhaul data. Certainly, when required, the third network device may also send a backhaul request to the network device 200. Therefore, as shown in FIG. 3-e, the network device 200 further includes:

a third receiving module 350, configured to receive the backhaul request sent by the second network device, where the backhaul request includes at least one of the following: a total data volume of a to-be-backhauled service, an allowed transmission delay, a priority of a to-be-backhauled service, a minimum backhaul rate that needs to be supported by a to-be-backhauled service, or source/destination network information of a to-be-backhauled service.

Because the second network device may perform uplink backhaul and downlink backhaul, specifically, when the second network device that sends the backhaul request is an uplink device, the backhaul request sent to the network device 200 may be specifically an uplink backhaul request; when the second network device that sends the backhaul request is a downlink device, the backhaul request sent to the network device 200 may be specifically a downlink backhaul request.

Optionally, the source/destination network information of a to-be-backhauled service may specifically include a source/destination network type, a source/destination network address, and the like. A network type and a network address may be a network type and a network address that are related to the field of communications. For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

As shown in FIG. 3-f, the network device 200 further includes a fourth receiving module 340.

The fourth receiving module 360 is configured to receive the residual backhaul capability information sent by the third network device, where the residual backhaul capability information includes at least one of the following: a backhaul capability margin, a delay experienced during backhaul, a buffer area size, a backhaul charging method, a type of a network in which backhaul arrives, or a backhaul link reliability index.

Specifically, the backhaul capability margin is a value of a data rate that can be additionally supported by the third network device; the charging method may include free of charge, monthly-package charging, or traffic-based charging; the type of a network may include Internet, a core network of a telecommunications operator, a network device 200, or another dedicated network, that is, data may be backhauled to the Internet, the core network of the telecommunications operator, another network device 200, or the another dedicated network by using the third network device; the backhaul link reliability index refers to an interruption probability of a backhaul link.

The third network device has a capability of directly connecting to the core network to perform backhaul. The network device 200 learns the residual backhaul capability information of the third network device before allocating a backhaul control resource, so that the backhaul control resource can be allocated properly according to the residual backhaul capability information of the third network device.

It may be understood that the broadcast module is specifically configured to send the backhaul control information to the second network device and the third network device, so that the second network device backhauls, by using a physical resource indicated by the physical resource allocation information, data in the backhaul path indicated by the backhaul network topology control information, and after receiving the backhaul control information, the third network device backhauls data according to the backhaul control information by using a backhaul capability of the third network device.

Specifically, the backhaul control information includes the backhaul network topology control information and the physical resource allocation information. The backhaul network topology control information mainly includes at least one backhaul path, and the backhaul path is mainly allocated by the network device 200 to the second network device that sends the backhaul request, and is a backhaul path that may be used by the second network device to backhaul data, where each backhaul path includes a one-hop or multi-hop connection, and each hop of connection indicates a data transmission channel between two second network devices or between the second network device and the third network device. Correspondingly, the physical resource allocation information includes an available physical resource corresponding to each backhaul path, and specifically, the physical resource allocation information includes a corresponding physical resource that can be used on each hop of connection when data is backhauled on each hop of connection, where the physical resource includes a time domain, a frequency domain, a space domain, a code domain, and the like that may be used on each hop of connection. Further, the time domain resource is specifically a timeslot resource set in a system; the frequency domain resource is specifically carrier information and frequency domain resource information of a smaller granularity on a carrier, for example, a PRB set in an LTE system; the space domain resource may be a piece of precoding information in a predefined codebook or information about a selection of multiple directional beams; the code domain resource may be indication information of one or more codes in an available orthogonal/quasi-orthogonal code set. In addition, the physical resource allocation information may further indicate modulation and coding scheme (MCS for short) information that is recommended for use. It should be noted that multiple foregoing connections may be defined between two second network devices, and a case in which some of physical resources corresponding to the multiple connections are the same may exist.

Therefore, after receiving the backhaul control information, the second network device backhauls, by using a corresponding physical resource, data in a path allocated to the second network device by using the backhaul control information. Specifically, if the backhaul control information is for an uplink backhaul request sent by the second network device, it is assumed that the uplink backhaul is mainly that the second network device backhauls data to the third network device; if the backhaul path in the backhaul network topology control information in the backhaul control information includes multiple hops, the second network device first backhauls to-be-backhauled data to a receive end on the first hop, and then backhauls the to-be-backhauled data from the receive end on the first hop to a receive end on the second hop, until the data is backhauled to the third network device. When the data is backhauled on each hop of the backhaul path, the physical resource allocated in the physical resource allocation information may be used. Finally, after receiving the data backhauled from the second network device, the third network device completes backhaul by using a backhaul network of the third network device. Likewise, if the backhaul control information is for a downlink backhaul request, it is assumed that the downlink backhaul is mainly that the third network device sends data to the second network device, and the third network device backhauls the data to the second network device hop by hop according to the backhaul path indicated by the backhaul control information and according to the backhaul control information sent by the network device 200 to the second network device that is a receive end. Certainly, if more than one backhaul path is indicated by the backhaul control information, to-be-backhauled data may be split and transmitted in multiple backhaul paths, which can implement a higher backhaul speed.

As shown in FIG. 4, an embodiment of the present invention further provides a network device 400, which may include:

a request sending module 410, configured to send a backhaul request to a first network device, where the backhaul request is used to request backhaul control information from the first network device, and the backhaul control information includes backhaul network topology control information and physical resource allocation information;

a first information receiving module 420, configured to receive the backhaul control information broadcasted by the first network device, where the backhaul control information is obtained by the first network device according to channel state information, the backhaul request, and residual backhaul capability information sent by a third network device; and a first data backhaul module 430, configured to backhaul data according to the backhaul control information.

In this embodiment of the present invention, the request sending module 410 of the network device 400 sends the backhaul request to the first network device, to request the backhaul control information from the first network device; and then the first information receiving module 420 receives the backhaul control information broadcasted by the first network device, where the backhaul control information includes the backhaul network topology control information and the physical resource allocation information; and the data backhaul module 430 backhauls data according to the backhaul control information received by the first information receiving module 420. Therefore, a capacity of an entire backhaul network is improved.

In an LTE network, three types of nodes are specifically defined:

D-Node, which is a macro node having a relatively large coverage capability and has a capability of connecting to a core network;

M-Node, which can implement wireless communication with a D-Node on at least one carrier and can implement wireless communication with a neighboring M-Node on at least one carrier; and M-G-Node, which is a node combining functions of an M-Node and a G-Node, where the G-Node has a capability of directly performing backhaul with a core network in addition to performing backhaul by using a D-Node, and therefore, the M-G-Node not only can implement wireless communication with the D-Node on at least one carrier and can implement wireless communication with a neighboring M-Node on at least one carrier, but also has a capability of directly performing backhaul with a core network in addition to performing backhaul by using a D-Node.

A coverage network of the D-Node includes at least one M-Node and at least one M-G-Node.

The first network device provided in this embodiment of the present invention is the D-Node in the LTE network, the network device 400 is the M-Node, and the third network device is the M-G-Node. Preferably, the D-Node may be specifically an eNodeB; the M-Node and the M-G-Node may be specifically eNodeBs or may be UE that can provide access to another terminal device or UE that has a specific backhaul capability.

The following further describes the network device 400 provided in FIG. 4:

The network device 400 backhauls data according to the backhaul control information sent by the first network device, where the backhaul control information is obtained by the first network device according to the channel state information of a network, the backhaul request sent by the network device 400, and the residual backhaul capability information sent by the third network device, and the channel state information of the network may be measured by the network device 400 and the third network device and then sent to the first network device. Specifically, the network device 400 may measure the channel state information in the following manners:

Manner 1: As shown in FIG. 5-a, the network device 400 further includes:

a fifth receiving module 510, configured to receive a reference signal instruction message sent by the first network device, where the reference signal instruction message is used to instruct to send a reference signal or measure the channel state information.

The network device 400 measures the channel state information, which may be performed on a premise that the first network device sends the reference signal instruction message. The reference signal instruction message is mainly sent by the first network device and used to instruct one or more network devices of the network device 400 or the third network device to send a reference signal and another network device to measure the channel state information.

Optionally, the reference signal may include a CSI-RS and/or CSI-IM, or the like.

It is assumed that the network has network devices 400 2A, 2B, 2C, and 2D and third network devices 3A, 3B, 3C, and 3D, and one or more of the network devices 400 or the third network devices may be specifically understood as the following situations:

S1. any one or more of 2A, 2B, 2C, 2D, 3A, 3B, 3C, or 3D;

S2. any one or more of 2A, 2B, 2C, or 2D;

S3. any one or more of 3A, 3B, 3C, or 3D;

S4. any one or more of 2A, 2B, 2C, or 2D, and any one or more of 3A, 3B, 3C, or 3D.

As shown in FIG. 5-b, when the reference signal instruction message received by the fifth receiving module 510 instructs the network device 400 to send a reference signal, the network device 400 further includes:

a first sending module 520, configured to send the reference signal according to the reference signal indication message.

As shown in FIG. 5-c, when the reference signal instruction message received by the fifth receiving module 510 instructs the network device 400 to measure the channel state information, the network device further includes:

a first measurement module 530, configured to: if the received reference signal instruction message is used to instruct to measure the channel state information, measure feedback parameters such as a precoding matrix indicator PMI, a channel quality indicator CQI, and a Rank according to an instruction of the reference signal instruction message, to obtain the channel state information, and send the channel state information obtained by measurement to the first network device, where the channel state information includes the feedback parameters such as the PMI, the CQI, and the Rank; and a second sending module 540, configured to send the channel state information to the first network device.

When measuring the channel state information, the network device 400 mainly performs measurement according to the reference signal instruction message broadcasted by the first network device, and the fifth receiving module 510 of the network device 400 is specifically configured to receive the reference signal instruction message sent by the first network device, where the reference signal instruction message is used to instruct to send a reference signal or measure the channel state information. When the reference signal instruction message instructs the network device 400 to send a reference signal, the network device 400 further includes the first sending module 520, where the first sending module 520 sends the reference signal according to an instruction of the reference signal indication message; when the reference signal instruction message does not instruct the network device 400 to send a reference signal, the network device 400 further includes the first measurement module 530, where the first measurement module 530 measures the feedback parameters such as the PMI, the CQI, and the Rank according to an instruction of the reference signal instruction message, to obtain the channel state information, where the channel state information includes the feedback parameters such as the PMI, the CQI, and the Rank, and then, the second sending module 540 sends the channel state information obtained by measurement to the first network device.

Optionally, the reference signal may specifically include a CSI-RS and/or CSI-IM, or the like.

Manner 2: In a case in which the first network device does not need to send a reference signal instruction message used for measuring the channel state information, the network device 400 and the third network device perform measurement according to another reference signal resource such as a CRS or a DMRS, to obtain the channel state information, and then send the channel state information to the first network device. Therefore, as shown in FIG. 5-*d,* the network device 400 further includes:

a second measurement module 550, configured to measure the channel state information according to a reference signal resource, where the reference signal resource includes a common reference signal CRS and a demodulation reference signal DMRS; and a third sending module 560, configured to send the channel state information obtained by the second measurement module 550 by measurement to the first network device.

Certainly, the channel state information may not only be measured by the network device 400 and the third network device as described above, but also be directly obtained from a database of a third-party database by the first network device, and no limitation is imposed thereto herein.

Because the network device 400 may perform uplink backhaul and downlink backhaul, specifically, when the network device 400 that sends the backhaul request is an uplink device, the backhaul request sent to the first network device may be specifically an uplink backhaul request; when the network device 400 that sends the backhaul request is a downlink device, the backhaul request sent to the first network device may be specifically a downlink backhaul request, where the backhaul request may include one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the network information may include source/destination network type information and a source/destination network address, and a network type and a network address may be a network type and a network address that are related to the field of communications. For example, if the network device 400 sends a downlink backhaul request, a source network type may be Internet and a source network address may be an address of the Internet, and a destination network type may be a telecommunications network and a destination network address may be a network indicator or the like of the network device 400 that sends the backhaul request. If the network device 400 sends an uplink backhaul request, a source network type may be a telecommunications network and a source network address may be a network indicator of the network device 400 that sends the backhaul request, and a destination network type may be Internet and a destination network address may be an address of the Internet.

Specifically, the residual backhaul capability information sent by the third network device to the first network device includes one or more items of the following content:

B1. a backhaul capability margin of the third network device;

B2. a delay experienced when the third network device performs backhaul;

B3. a buffer area size of the third network device;

B4. a charging method for backhaul of the third network device;

B5. a type of a network in which backhaul of the third network device can arrive;

B6. a backhaul link reliability index.

Specifically, the backhaul capability margin in B1 is a value of a data rate that can be additionally supported by the third network device; the charging method in B4 may include free of charge, monthly-package charging, or traffic-based charging; the type of a network in B5 may include Internet, a core network of a telecommunications operator, a first network device, or another dedicated network, that is, data may be backhauled to the Internet, the core network of the telecommunications operator, another first network device, or the another dedicated network by using the third network device; the backhaul link reliability index in B6 refers to an interruption probability of a backhaul link.

Specifically, the backhaul control information includes the backhaul network topology control information and the physical resource allocation information. The backhaul network topology control information mainly includes at least one backhaul path, and the backhaul path is mainly allocated by the first network device to the network device 400 that sends the backhaul request, and is a backhaul path that may be used by the network device 400 to backhaul data, where each backhaul path includes a one-hop or multi-hop connection, and each hop of connection indicates a data transmission channel between two network devices 400 or between the network device 400 and the third network device. Correspondingly, the physical resource allocation information includes an available physical resource corresponding to each backhaul path, and specifically, the physical resource allocation information includes a corresponding physical resource that can be used on each hop of connection when data is backhauled on each hop of connection, where the physical resource includes a time domain, a frequency domain, a space domain, a code domain, and the like that may be used on each hop of connection. Further, the time domain resource is specifically a timeslot resource set in a system; the frequency domain resource is specifically carrier information and frequency domain resource information of a smaller granularity on a carrier, for example, a PRB set in an LTE system; the space domain resource may be a piece of precoding information in a predefined codebook or information about a selection of multiple directional beams; the code domain resource may be indication information of one or more codes in an available orthogonal/quasi-orthogonal code set. In addition, the physical resource allocation information may further indicate MCS information that is recommended for use. It should be noted that multiple foregoing connections may be defined between two network devices 400, and a case in which some of physical resources corresponding to the multiple connections are the same may exist.

Therefore, after receiving the backhaul control information, the network device 400 backhauls, by using a corresponding physical resource, data in the path allocated to the network device 400 by using the backhaul control information. Specifically, if the backhaul control information is for an uplink backhaul request sent by the network device 400, it is assumed that the uplink backhaul is mainly that the network device 400 backhauls data to the third network device; if the backhaul path in the backhaul network topology control information in the backhaul control information includes multiple hops, the network device 400 first backhauls to-be-backhauled data to a receive end on the first hop, and then backhauls the to-be-backhauled data from the receive end on the first hop to a receive end on the second hop, until the data is backhauled to the third network device. When the data is backhauled on each hop of the backhaul path, the physical resource allocated in the physical resource allocation information may be used. Finally, after receiving the data backhauled from the network device 400, the third network device completes backhaul by using a backhaul network of the third network device. Likewise, if the backhaul control information is for a downlink backhaul request, it is assumed that the downlink backhaul is mainly that the third network device sends data to the network device 400, and the third network device backhauls the data to the network device 400 hop by hop according to the backhaul path indicated by the backhaul control information and according to the backhaul control information sent by the first network device to the network device 400 that is a receive end. Certainly, if more than one backhaul path is indicated by the backhaul control information, to-be-backhauled data may be split and transmitted in multiple backhaul paths, which can implement a higher backhaul speed.

As shown in FIG. 6, an embodiment of the present invention further provides a network device 600, which may include:

a backhaul capability sending module 610, configured to send residual backhaul capability information to a first network device, where the residual backhaul capability information includes information about a backhaul capability that is left after data is backhauled according to a backhaul capability of the network device;

a second information receiving module 620, configured to receive backhaul control information broadcasted by the first network device, where the backhaul control information is obtained by the first network device according to channel state information, a backhaul request sent by a second network device, and the residual backhaul capability information, and the backhaul control information includes backhaul network topology control information and physical resource allocation information; and a third data backhaul module 630, configured to backhaul data according to the backhaul control information.

The backhaul capability sending module 610 sends the residual backhaul capability information to the first network device; the first network device obtains the backhaul control information according to the residual backhaul capability information, the channel state information, and the backhaul request sent by the second network device; after the second information receiving module 620 receives the backhaul control information, the third data backhaul module 630 backhauls data according to the backhaul control information. Therefore, a capacity of a backhaul network is improved.

In an LTE network, three types of nodes are specifically defined:

D-Node, which is a macro node having a relatively large coverage capability and has a capability of connecting to a core network;

M-Node, which can implement wireless communication with a D-Node on at least one carrier and can implement wireless communication with a neighboring M-Node on at least one carrier; and M-G-Node, which is a node combining functions of an M-Node and a G-Node, where the G-Node has a capability of directly performing backhaul with a core network in addition to performing backhaul by using a D-Node, and therefore, the M-G-Node not only can implement wireless communication with the D-Node on at least one carrier and can implement wireless communication with a neighboring M-Node on at least one carrier, but also has a capability of directly performing backhaul with a core network in addition to performing backhaul by using a D-Node.

A coverage network of the D-Node includes at least one M-Node and at least one M-G-Node.

The first network device provided in this embodiment of the present invention is the D-Node in the LTE network, the second network device is the M-Node, and the network device 600 is the M-G-Node. Preferably, the D-Node may be specifically an eNodeB; the M-Node and the M-G-Node may be specifically eNodeBs or may be UE that can provide access to another terminal device or UE that has a specific backhaul capability.

The following further describes the network device 600 provided in FIG. 6:

The network device 600 backhauls data according to the backhaul control information sent by the first network device, where the backhaul control information is obtained by the first network device according to the channel state information of a network, the backhaul request sent by the second network device, and the residual backhaul capability information sent by the network device 600, and the channel state information of the network may be measured by the second network device and the network device 600 and then sent to the first network device. Specifically, the network device 600 may measure the channel state information in the following manners:

Manner 1: As shown in FIG. 7-a, the network device further includes:

a sixth receiving module 710, configured to receive a reference signal instruction message broadcasted by the first network device, where the reference signal instruction message is used to instruct to send a reference signal or measure the channel state information.

The network device 600 may measure the channel state information on a premise that the first network device sends the reference signal instruction message. The reference signal instruction message is mainly sent by the first network device and used to instruct one or more of the second network device or the network device 600 to send a reference signal and another network device to measure the channel state information.

Optionally, the reference signal may specifically include a CSI-RS and/or CSI-IM, or the like.

It is assumed that the network has second network devices 2A, 2B, 2C, and 2D and network devices 600 3A, 3B, 3C, and 3D, one or more of the second network devices or the network devices 600 may be specifically understood as the following situations:

S1. any one or more of 2A, 2B, 2C, 2D, 3A, 3B, 3C, or 3D;

S2. any one or more of 2A, 2B, 2C, or 2D;

S3. any one or more of 3A, 3B, 3C, or 3D;

S4. any one or more of 2A, 2B, 2C, or 2D, and any one or more of 3A, 3B, 3C, or 3D.

As shown in FIG. 7-b, when the reference signal instruction message received by the sixth receiving module 710 instructs the network device 600 to send a reference signal, the network device 600 further includes:

a fifth sending module 720, configured to send the reference signal according to the reference signal indication message.

As shown in FIG. 7-c, when the reference signal instruction message received by the sixth receiving module 710 instructs the network device 600 to measure the channel state information, the network device 600 further includes:

a third measurement module 730, configured to measure feedback parameters such as a precoding matrix indicator PMI, a channel quality indicator CQI, and a Rank according to an instruction of the reference signal instruction message, to obtain the channel state information, where the channel state information includes the feedback parameters such as the PMI, the CQI, and the Rank; and a sixth sending module 740, configured to send the channel state information to the first network device.

When measuring the channel state information, the network device 600 mainly performs measurement according to the reference signal instruction message broadcasted by the first network device, and the sixth receiving module 710 of the network device 600 is specifically configured to receive the reference signal instruction message sent by the first network device, where the reference signal instruction message is used to instruct to send a reference signal or measure the channel state information. When the reference signal instruction message instructs the network device 600 to send a reference signal, the network device 600 further includes the fifth sending module 720, where the fifth sending module 720 sends the reference signal according to an instruction of the reference signal indication message; when the reference signal instruction message does not instruct the network device 600 to send a reference signal, the network device 600 further includes the third measurement module 730, where the third measurement module 730 measures the feedback parameters such as the PMI, the CQI, and the Rank according to an instruction of the reference signal instruction message, to obtain the channel state information, where the channel state information includes the feedback parameters such as the PMI, the CQI, and the Rank, and then, the sixth sending module 740 sends the channel state information obtained by measurement to the first network device.

Manner 2: In a case in which the first network device does not need to send a reference signal instruction message used for measuring the channel state information, the second network device and the network device 600 perform measurement according to another reference signal resource such as a CRS or a DMRS, to obtain the channel state information, and then send the channel state information to the first network device. Therefore, as shown in FIG. 7-d, the network device 600 further includes:

a fourth measurement module 750, configured to measure the channel state information according to a reference signal resource, where the reference signal includes a common reference signal CRS and a demodulation reference signal DMRS; and a seventh sending module 760, configured to send the channel state information obtained by the fourth measurement module 750 by measurement to the first network device.

Certainly, the channel state information may not only be measured by the second network device and the network device 600 as described above, but also be directly obtained from a database of a third-party database by the first network device, and no limitation is imposed thereto herein.

The third-party database refers to a database of the channel state information obtained in the foregoing manner of measurement and feedback, or another manner, for example, a database of channel state information generated according to a mathematical model by using known geographical location information, or a database formed by performing measurement by another device and saving a measurement result.

Specifically, the backhaul request sent by the second network device to the first network device may include one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the source/destination network information may include source/destination network type information and a source/destination network address, and a network type and a network address may be a network type and a network address that are related to the field of communications.

Because the second network device may perform uplink backhaul and downlink backhaul, specifically, when the second network device that sends the backhaul request is an uplink device, the backhaul request sent to the first network device may be specifically an uplink backhaul request; when the second network device that sends the backhaul request is a downlink device, the backhaul request sent to the first network device may be specifically a downlink backhaul request.

For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

Specifically, the residual backhaul capability information sent by the network device 600 to the first network device includes one or more items of the following content:

B1. a backhaul capability margin of the network device 600;

B2. a delay experienced when the network device 600 performs backhaul;

B3. a buffer area size of the network device 600;

B4. a charging method for backhaul of the network device 600;

B5. a type of a network in which backhaul of the network device 600 can arrive;

B6. a backhaul link reliability index.

Specifically, the backhaul capability margin in B1 is a value of a data rate that can be additionally supported by the network device 600; the charging method in B4 may include free of charge, monthly-package charging, or traffic-based charging; the type of a network in B5 may include Internet, a core network of a telecommunications operator, a first network device, or another dedicated network, that is, data may be backhauled to the Internet, the core network of the telecommunications operator, another first network device, or the another dedicated network by using the network device 600; the backhaul link reliability index in B6 refers to an interruption probability of a backhaul link.

Specifically, the backhaul control information includes the backhaul network topology control information and the physical resource allocation information. The backhaul network topology control information mainly includes at least one backhaul path, and the backhaul path is mainly allocated by the first network device to the second network device that sends the backhaul request, and is a backhaul path that may be used by the second network device to backhaul data, where each backhaul path includes a one-hop or multi-hop connection, and each hop of connection indicates a data transmission channel between two second network devices or between the second network device and the third network device. Correspondingly, the physical resource allocation information includes an available physical resource corresponding to each backhaul path, and specifically, the physical resource allocation information includes a corresponding physical resource that can be used on each hop of connection when data is backhauled on each hop of connection, where the physical resource includes a time domain, a frequency domain, a space domain, a code domain, and the like that may be used on each hop of connection. Further, the time domain resource is specifically a timeslot resource set in a system; the frequency domain resource is specifically carrier information and frequency domain resource information of a smaller granularity on a carrier, for example, a PRB set in an LTE system; the space domain resource may be a piece of precoding information in a predefined codebook or information about a selection of multiple directional beams; the code domain resource may be indication information of one or more codes in an available orthogonal/quasi-orthogonal code set. In addition, the physical resource allocation information may further indicate MCS information that is recommended for use. It should be noted that multiple foregoing connections may be defined between two second network devices, and a case in which some of physical resources corresponding to the multiple connections are the same may exist.

Therefore, after receiving the backhaul control information, the second network device backhauls, by using a corresponding physical resource, data in a path allocated to the second network device by using the backhaul control information.

Specifically, if the backhaul control information is for an uplink backhaul request sent by the second network device, it is assumed that the uplink backhaul is mainly that the second network device backhauls data to the network device 600; if the backhaul path in the backhaul network topology control information in the backhaul control information includes multiple hops, the second network device first backhauls to-be-backhauled data to a receive end on the first hop, and then backhauls the to-be-backhauled data from the receive end on the first hop to a receive end on the second hop, until the data is backhauled to the network device 600. When the data is backhauled on each hop of the backhaul path, the physical resource allocated in the physical resource allocation information may be used. Finally, after receiving the data backhauled from the second network device, the network device 600 completes backhaul by using a backhaul network of the network device 600. Likewise, if the backhaul control information is for a downlink backhaul request, it is assumed that the downlink backhaul is mainly that the network device 600 sends data to the second network device, and the network device 600 backhauls the data to the second network device hop by hop according to the backhaul path indicated by the backhaul control information and according to the backhaul control information sent by the first network device to the second network device that is a receive end. Certainly, if more than one backhaul path is indicated by the backhaul control information, to-be-backhauled data may be split and transmitted in multiple backhaul paths, which can implement a higher backhaul speed.

As shown in FIG. 8-*a*, an embodiment of the present invention further provides a data backhaul implementation system 800, which may specifically include: the first network device 200 according to any one of FIG. 2 to FIG. 3-*f*, the second network device 400 according to any one of FIG. 4 to FIG. 5-*d*, and the third network device 600 according to any one of FIG. 6 to FIG. 7-*d*.

The first network device 200 is configured to: obtain, according to channel state information, a backhaul request of the second network device 400, and residual backhaul capability information of the third network device 600, backhaul control information used for controlling the second network device 400 and the third network device 600 to backhaul data; and send the backhaul control information to the second network device 400 and the third network device 600, so that the second network device 400 and the third network device 600 backhaul data according to the backhaul control information.

The second network device 400 receives the backhaul control information sent by the first network device 200, and backhauls data according to the backhaul control information.

The third network device 600 receives the backhaul control information sent by the first network device 200, and backhauls data according to the backhaul control information.

The backhaul control information includes backhaul network topology control information and physical resource allocation information.

The data backhaul implementation system provided in this embodiment of the present invention mainly includes: the first network device 200, the second network device 400, and the third network device 600, where the first network device 200 is mainly configured to send, to the second network device 400 and the third network device 600, the backhaul control information used for controlling data backhaul; and after receiving the backhaul control information, the second network device 400 and the third network device 600 separately backhaul data according to the backhaul control information. In the present invention, the first network device 200 allocates backhaul resources in a centralized manner, so that centralized control and management can be effectively performed, and backhaul network capacities of the second network device 400 and the third network device 600 are improved.

The data backhaul implementation system provided in this embodiment of the present invention is applied to an LTE network. As shown in FIG. 6-*b*, in the LTE network, three types of nodes are specifically defined:

D-Node, which is a macro node having a relatively large coverage capability and has a capability of connecting to a core network;

M-Node, which can implement wireless communication with a D-Node on at least one carrier and can implement wireless communication with a neighboring M-Node on at least one carrier; and M-G-Node, which is a node combining functions of an M-Node and a G-Node, where the G-Node has a capability of directly performing backhaul with a core network in addition to performing backhaul by using a D-Node, and therefore, the M-G-Node not only can implement wireless communication with the D-Node on at least one carrier and can implement wireless communication with a neighboring M-Node on at least one carrier, but also has a capability of directly performing backhaul with a core network in addition to performing backhaul by using a D-Node.

A coverage network of the D-Node includes at least one M-Node and at least one M-G-Node.

The first network device 200 provided in this embodiment of the present invention is the D-Node, the second network device 400 is the M-Node, and the third network device 600 is the M-G-Node. Preferably, the D-Node may be specifically an eNodeB; the M-Node and the M-G-Node may be specifically eNodeBs or may be UE that can provide access to another terminal device or UE that has a specific backhaul capability.

With reference to FIG. 6-b, the following further describes the data backhaul implementation system provided in FIG. 6-a:

A coverage network of the first network device 200 includes the second network device 400 and the third network device 600. Although the third network device has a capability of connecting to a core network and may backhaul data according to a backhaul capability of the third network device, backhaul resources are still allocated to the second network device 400 and the third network device 600 by the first network device 200 in a centralized manner. A corresponding backhaul resource is allocated, so that the second network device 400 can backhaul data according to the allocated backhaul resource, and the third network device 600 can backhaul data under centralized control of the first network device 200 by using the backhaul capability of the third network device 600. The first network device 200 controls the second network device 400 and the third network device in a centralized manner to backhaul data mainly by sending the backhaul control information to the second network device 400 and the third network device 600, where the backhaul control information is obtained by the first network device 200 according to the channel state information of a network, the backhaul request of the second network device 400, and the residual backhaul capability information of the third network device 600. Therefore, before the D-Node sends the backhaul control information, the M-Node and/or the M-G-Node correspondingly feed back the channel state information, the backhaul request, and the residual backhaul capability information.

This embodiment of the present invention specifically provides three manners of obtaining the channel state information of the network. Certainly, a person skilled in the art may understand that the channel state information of the network may also be obtained in another manner, and no limitation is imposed thereto herein.

Manner 1: The first network device 200 broadcasts a reference signal instruction message to the second network device 400 and the third network device 600, where the reference signal instruction message is used to instruct one or more network devices of the second network device 400 or the third network device 600 to send a reference signal and another network device to measure the channel state information.

Optionally, the reference signal may specifically include a CSI-RS and/or CSI-IM, or the like.

It is assumed that the network has second network devices 2A, 2B, 2C, and 2D and third network devices 3A, 3B, 3C, and 3D, and one or more of the second network devices or the third network devices may be specifically understood as the following situations:

S1. any one or more of 2A, 2B, 2C, 2D, 3A, 3B, 3C, or 3D;

S2. any one or more of 2A, 2B, 2C, or 2D;

S3. any one or more of 3A, 3B, 3C, or 3D;

S4. any one or more of 2A, 2B, 2C, or 2D, and any one or more of 3A, 3B, 3C, or 3D.

Then, the second network device 400 and the third network device 600 perform an operation according to the received reference signal instruction message. If the reference signal instruction message is used to instruct to send the reference signal, the second network device 400 or the third network device 600 sends the reference signal on a resource indicated by the reference signal instruction message; or if the reference signal instruction message is used to instruct to measure the channel state information, the second network device 400 or the third network device 600 measures feedback parameters such as a PMI, a CQI, and a Rank according to an instruction of the reference signal instruction message, to obtain the channel state information. Then, the second network device or the third network device sends the channel state information obtained by measurement to the first network device 200, where the channel state information includes the PMI, the CQI, and the Rank.

Manner 2: The first network device 200 is further configured to obtain the channel state information by using a third-party database.

The third-party database refers to a database of the channel state information obtained in the foregoing manner of measurement and feedback, or another manner, for example, a database of channel state information generated according to a mathematical model by using known geographical location information, or a database formed by performing measurement by another device and saving a measurement result.

Manner 3: In a case in which the first network device 200 does not need to send a reference signal instruction message used for measuring the channel state information, the second network device 400 and the third network device 600 perform measurement according to another reference signal resource such as a CRS or a DMRS, to obtain the channel state information, and then send the channel state information to the first network device 200.

Specifically, the second network device 400 does not have a capability of connecting to a core network, and when backhauling data, sends the backhaul request to the first network device 200 to request the first network device 200 to broadcast the backhaul control information, to implement data backhaul. Certainly, when required, the third network device may also send a backhaul request to the network device 200, and no limitation is imposed thereto herein.

Because the second network device may perform uplink backhaul and downlink backhaul, specifically, when the second network device that sends the backhaul request is an uplink device, the backhaul request sent to the first network device may be specifically an uplink backhaul request; when the second network device that sends the backhaul request is a downlink device, the backhaul request sent to the first network device may be specifically a downlink backhaul request, where the backhaul request may include one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the source/destination network information may include source/destination network type information and a source/destination network address. A network type and a network address may be a network type and a network address that are related to the field of communications. For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

Specifically, the third network device 600 is further configured to send the residual backhaul capability information to the first network device 200, so that the first network device 200 can perform centralized control according to a residual backhaul capability of the third network device 600.

The residual backhaul capability information sent by the third network device 600 to the first network device 200 includes one or more items of the following content:

B1. a backhaul capability margin of the third network device 600;

B2. a delay experienced when the third network device 600 performs backhaul;

B3. a buffer area size of the third network device 600;

B4. a charging method for backhaul of the third network device 600;

B5. a type of a network in which backhaul of the third network device 600 can arrive;

B6. a backhaul link reliability index.

Specifically, the backhaul capability margin in B1 is a value of a data rate that can be additionally supported by the third network device 600; the charging method in B4 may include free of charge, monthly-package charging, or traffic-based charging; the type of a network in B5 may include Internet, a core network of a telecommunications operator, a first network device 200, or another dedicated network, that is, data may be backhauled to the Internet, the core network of the telecommunications operator, another first network device 200, or the another dedicated network by using the third network device 600; the backhaul link reliability index in B6 refers to an interruption probability of a backhaul link.

Specifically, the backhaul control information obtained by the first network device 200 according to the channel state information of a network, the backhaul request sent by the second network device 400, and the residual backhaul capability information sent by the third network device 600 includes the backhaul network topology control information and the physical resource allocation information. The backhaul network topology control information mainly includes at least one backhaul path, and the backhaul path is mainly allocated by the first network device 200 to the second network device 400 that sends the backhaul request, and is a backhaul path that may be used by the second network device 400 to backhaul data, where each backhaul path includes a one-hop or multi-hop connection, and each hop of connection indicates a data transmission channel between two second network devices 400 or between the second network device 400 and the third network device 600. Correspondingly, the physical resource allocation information includes an available physical resource corresponding to each backhaul path, and specifically, the physical resource allocation information includes a corresponding physical resource that can be used on each hop of connection when data is backhauled on each hop of connection, where the physical resource includes a time domain, a frequency domain, a space domain, a code domain, and the like that may be used on each hop of connection. Further, the time domain resource is specifically a timeslot resource set in a system; the frequency domain resource is specifically carrier information and frequency domain resource information of a smaller granularity on a carrier, for example, a PRB set in an LTE system; the space domain resource may be a piece of precoding information in a predefined codebook or information about a selection of multiple directional beams; the code domain resource may be indication information of one or more codes in an available orthogonal/quasi-orthogonal code set. In addition, the physical resource allocation information may further indicate MCS information that is recommended for use. It should be noted that multiple foregoing connections may be defined between two second network devices 400, and a case in which some of physical resources corresponding to the multiple connections are the same may exist.

Therefore, after receiving the backhaul control information, the second network device 400 backhauls, by using a corresponding physical resource, data in a path allocated to the second network device 400 by using the backhaul control information. Specifically, if the backhaul control information is for an uplink backhaul request sent by the second network device, it is assumed that the uplink backhaul is mainly that the second network device backhauls data to the third network device; if the backhaul path in the backhaul network topology control information in the backhaul control information includes multiple hops, the second network device first backhauls to-be-backhauled data to a receive end on the first hop, and then backhauls the to-be-backhauled data from the receive end on the first hop to a receive end on the second hop, until the data is backhauled to the third network device. When the data is backhauled on each hop of the backhaul path, the physical resource allocated in the physical resource allocation information may be used. Finally, after receiving the data backhauled from the second network device, the third network device completes backhaul by using a backhaul network of the third network device. Likewise, if the backhaul control information is for a downlink backhaul request, it is assumed that the downlink backhaul is mainly that the third network device sends data to the second network device, and the third network device backhauls the data to the second network device hop by hop according to the backhaul path indicated by the backhaul control information and according to the backhaul control information sent by the first network device to the second network device that is a receive end. Certainly, if more than one backhaul path is indicated by the backhaul control information, to-be-backhauled data may be split and transmitted in multiple backhaul paths, which can implement a higher backhaul speed.

An embodiment of the present invention further provides a data backhaul implementation method. As shown in FIG. 9-*a*, the data backhaul implementation method specifically includes:

S9101. Obtain, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information.

This step and the following step S9102 are executed by a first network device. In an LTE network, the first network device allocates a backhaul resource in a centralized manner and implements centralized control, so that a success rate of data backhaul is improved. Therefore, the backhaul control information mainly includes the backhaul network topology control information and the physical resource allocation information.

Because the second network device may perform uplink backhaul and downlink backhaul, specifically, when the second network device that sends the backhaul request is an uplink device, the backhaul request sent to the first network device may be specifically an uplink backhaul request; when the second network device that sends the backhaul request is a downlink device, the backhaul request sent to the first network device may be specifically a downlink backhaul request.

S9102. Send the backhaul control information to the second network device and the third network device, so that the second network device and the third network device backhaul data according to the backhaul control information.

The first network device allocates the backhaul resource in a centralized manner mainly in a manner of sending the backhaul control information to the second network device and the third network device, and then the second network device and the third network device backhaul data according to the backhaul control information.

In this embodiment of the present invention, the first network device sends the backhaul control information to the second network device and the third network device, so that the second network device and the third network device can backhaul data according to the received backhaul control information. Therefore, a success rate of data backhaul is effectively improved and a network resource is fully used.

As shown in FIG. 9-b, an embodiment of the present invention further provides a data backhaul implementation method, which may include:

S9201. Send a backhaul request to a first network device, where the backhaul request is used to request backhaul control information from the first network device, and the backhaul control information includes backhaul network topology control information and physical resource allocation information.

This step and the following steps S9202 and S9203 are executed by a second network device. In an LTE network, the first network device allocates a backhaul resource in a centralized manner and implements centralized control, so that a success rate of data backhaul is improved. The first network device allocates a backhaul resource in a centralized manner mainly by sending the backhaul control information to the second network device and a third network device, where the backhaul control information mainly includes the backhaul network topology control information and the physical resource allocation information.

Because the second network device may perform uplink backhaul and downlink backhaul, specifically, when the second network device that sends the backhaul request is an uplink device, the backhaul request sent to the first network device may be specifically an uplink backhaul request; when the second network device that sends the backhaul request is a downlink device, the backhaul request sent to the first network device may be specifically a downlink backhaul request.

S9202. Receive the backhaul control information broadcasted by the first network device, where the backhaul control information is obtained by the first network device according to channel state information, the backhaul request, and residual backhaul capability information sent by a third network device.

S9203. Backhaul data according to the backhaul control information.

After receiving the backhaul control information sent by the first network device, the second network device backhauls data according to the backhaul control information. Therefore, under centralized control of the first network device, the data is backhauled effectively and a success rate of data backhaul and efficiency of an entire system are improved.

In this embodiment of the present invention, the second network device receives the backhaul control information sent by the first network device, to implement centralized management of data backhaul in a network, where the backhaul control information includes the backhaul network topology control information and the physical resource allocation information; and then, backhauls data according to the backhaul control information. Therefore, a network resource is used effectively and a capacity of an entire backhaul network is improved.

As shown in FIG. 9-c, an embodiment of the present invention further provides a data backhaul implementation method, which may include:

S9301. Send residual backhaul capability information to a first network device, where the residual backhaul capability information is used to notify the first network device of a residual backhaul capability of a third network device, and the backhaul control information includes backhaul network topology control information and physical resource allocation information.

This step and the following steps S9302 and S9303 are executed by a second network device. In an LTE network, the first network device allocates a backhaul resource in a centralized manner and implements centralized control, so that a success rate of data backhaul is improved. The first network device allocates a backhaul resource in a centralized manner mainly by sending the backhaul control information to the second network device and a third network device, where the backhaul control information mainly includes the backhaul network topology control information and the physical resource allocation information.

S9302. Receive backhaul control information broadcasted by the first network device, where the backhaul control information is obtained by the first network device according to channel state information, a backhaul request sent by a second network device, and the residual backhaul capability information.

Because the second network device may perform uplink backhaul and downlink backhaul, specifically, when the second network device that sends the backhaul request is an uplink device, the backhaul request sent to the first network device may be specifically an uplink backhaul request; when the second network device that sends the backhaul request is a downlink device, the backhaul request sent to the first network device may be specifically a downlink backhaul request.

S9303. Backhaul data according to the backhaul control information.

After receiving the backhaul control information sent by the first network device, the third network device backhauls data according to the backhaul control information. Therefore, under centralized control of the first network device, the data is backhauled effectively and a success rate of data backhaul and efficiency of an entire system are improved.

In this embodiment of the present invention, the third network device receives the backhaul control information sent by the first network device, to implement centralized management of data backhaul in a network, where the backhaul control information includes the backhaul network topology control information and the physical resource allocation information; and then, backhauls data according to the backhaul control information. Therefore, a network resource is used effectively and a capacity of an entire backhaul network is improved.

In the LTE network, as shown in FIG. 8-b described above, three types of nodes are specifically defined:

D-Node, which is a macro node having a relatively large coverage capability and has a capability of connecting to a core network;

M-Node, which can implement wireless communication with a D-Node on at least one carrier and can implement wireless communication with a neighboring M-Node on at least one carrier; and M-G-Node (Mesh-Gateway Node), which is a node combining functions of an M-Node and a G-Node (Gateway Node), where the G-Node has a capability of directly performing backhaul with a core network in addition to performing backhaul by using a D-Node, and therefore, the M-G-Node not only can implement wireless communication with the D-Node on at least one carrier and can implement wireless communication with a neighboring M-Node on at least one carrier, but also has a capability of directly performing backhaul with a core network in addition to performing backhaul by using a D-Node.

A coverage network of the D-Node includes at least one M-Node and at least one M-G-Node.

Correspondingly, the first network device provided in the foregoing embodiment is the D-Node, the second network device is the M-Node, and the third network device is the M-G-Node. Preferably, the D-Node may be specifically an eNodeB; the M-Node and the M-G-Node may be specifically eNodeBs or may be UE that can provide access to another terminal device or UE that has a specific backhaul capability.

Based on the D-Node, the M-Node, and the M-G-Node, and from an actual application scenario, the following further describes the data backhaul implementation method provided in FIG. 9-a to FIG. 9-c:

As shown in FIG. 10-a, a data backhaul implementation method may include:

S1001. A D-Node broadcasts a reference signal instruction message to an M-Node and an M-G-Node, where the reference signal instruction message is used to instruct one or more of the M-Node or the M-G-Node to send a reference signal and another node to measure channel state information.

The D-Node sends the reference signal instruction message to the M-Node and the M-G-Node on at least one carrier, to instruct one or more of the M-Node or the M-G-Node to send a reference signal on a carrier, and instruct, to measure the channel state information, an M-Node and an M-G-Node that do not need to send the reference signal.

It is assumed that M-Nodes 2A, 2B, 2C, and 2D and M-G-Nodes 3A, 3B, 3C, and 3D are covered by the D-Node in an LTE network, and one or more of the M-Nodes or the M-G-Nodes may be specifically understood as the following situations:

S1. any one or more of 2A, 2B, 2C, 2D, 3A, 3B, 3C, or 3D;

S2. any one or more of 2A, 2B, 2C, or 2D;

S3. any one or more of 3A, 3B, 3C, or 3D;

S4. any one or more of 2A, 2B, 2C, or 2D, and any one or more of 3A, 3B, 3C, or 3D.

If the M-Node and the M-G-Node are instructed to broadcast a reference signal, the reference signal instruction message further specifically indicates a resource on which the M-Node and the M-G-Node send the reference signal.

Optionally, the reference signal may be a CSI-RS, CSI-IM, or the like.

S1002. The M-Node and the M-G-Node send, to the D-Node, the channel state information obtained by measurement according to the reference signal instruction message.

After the M-Node and the M-G-Node receive the reference signal instruction message broadcasted by the D-Node, if the reference signal instruction message instructs to send a reference signal, the M-Node or the M-G-Node sends the reference signal on a resource indicated by the reference signal instruction message; if the reference signal instruction message does not instruct to send a reference signal, feedback parameters such as a PMI, a CQI, a Rank, and the like that are supported by the LTE are measured according to the reference signal instruction message, to obtain the channel state information. It should be understood that the measured feedback parameters may also be feedback parameters of another type, and no limitation is imposed thereto herein. Therefore, the channel state information obtained by performing the measurement includes the PMI, the CQI, the Rank, and the like.

Optionally, the reference signal may specifically include a CSI-RS and/or CSI-IM, or the like.

S1003. The M-G-Node sends residual backhaul capability information to the D-Node.

The M-G-Node has a backhaul capability. The M-G-Node sends the residual backhaul capability information to the D-Node, so that the D-Node can refer to the residual backhaul capability information of the M-G-Node when allocating a backhaul resource.

The M-Node is not limited to send the residual backhaul capability information only on one specific carrier, but may perform the sending on any one of multiple carriers in a case in which the multiple carriers exist in a network.

Specifically, the residual backhaul capability information sent by the M-G-Node may include one or more items of the following content:

B1. a backhaul capability margin of the M-G-Node;

B2. a delay experienced when the M-G-Node performs backhaul;

B3. a buffer area size of the M-G-Node;

B4. a charging method for backhaul of the M-G-Node;

B5. a type of a network in which backhaul of the M-G-Node can arrive;

B6. a backhaul link reliability index.

Specifically, the backhaul capability margin in B1 is a value of a data rate that can be additionally supported by the M-G-Node; the charging method in B4 may include free of charge, monthly-package charging, or traffic-based charging; the type of a network in B5 may include Internet, a core network of a telecommunications operator, another D-Node, or another dedicated network, that is, data may be backhauled to the Internet, the core network of the telecommunications operator, the another D-Node, or the another dedicated network by using the M-G-Node; the backhaul link reliability index in B6 refers to an interruption probability of a backhaul link.

S1004. The M-Node sends a backhaul request to the D-Node.

The M-Node can implement wireless communication with the D-Node on at least one carrier and can implement wireless communication with a neighboring M-Node on at least one carrier, but the M-Node does not have a backhaul capability. Therefore, when the M-Node needs to backhaul data, the M-Node sends the backhaul request to the D-Node to request the D-Node to allocate a backhaul resource.

The M-Node is not limited to send the backhaul request only on one specific carrier, but may perform the sending on any one of multiple carriers in a case in which the multiple carriers exist in a network.

Specifically, the backhaul request sent by the M-Node may include one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the source/destination network information may include source/destination network type information and a source/destination network address. A network type and a network address may be a network type and a network address that are related to the field of communications. For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

S1005. The D-Node obtains backhaul control information according to the channel state information sent by the M-Node and the M-G-Node, the backhaul request of the M-Node, and the residual backhaul capability information of the M-G-Node, where the backhaul control information includes backhaul network topology control information and physical resource allocation information.

S1006. The D-Node sends the backhaul control information to the M-Node and the M-G-Node within a coverage network.

The D-Node obtains the backhaul control information according to the channel state information sent by the M-Node and the M-G-Node, the backhaul request of the M-Node, and the residual backhaul capability information of the M-G-Node and sends the backhaul control information to the M-Node and the M-G-Node.

Specifically, the D-Node may transmit the backhaul control information by using a physical channel such as a downlink PDCCH, a downlink PBCH, or a downlink EPDCCH.

S1007. The M-Node and the M-G-Node backhaul data according to the backhaul control information.

The M-Node and the M-G-Node under coverage of the D-Node send or receive data according to the backhaul control information on a network topology and a carrier that are instructed by the backhaul network topology control information and physical resource allocation information in the backhaul control information.

Specifically, the backhaul control information includes the backhaul network topology control information and the physical resource allocation information. The backhaul network topology control information mainly includes at least one backhaul path, and the backhaul path is mainly allocated by the D-Node to the M-Node that sends the backhaul request, and is a backhaul path that may be used by the M-Node to backhaul data, where each backhaul path includes a one-hop or multi-hop connection, and each hop of connection indicates a data transmission channel between two M-Nodes or between the M-Node and the M-G-Node. Correspondingly, the physical resource allocation information includes an available physical resource corresponding to each backhaul path, and specifically, the physical resource allocation information includes a corresponding physical resource that can be used on each hop of connection when data is backhauled on each hop of connection, where the physical resource includes a time domain, a frequency domain, a space domain, a code domain, and the like that may be used on each hop of connection. Further, the time domain resource is specifically a timeslot resource set in a system; the frequency domain resource is specifically carrier information and frequency domain resource information of a smaller granularity on a carrier, for example, a PRB set in an LTE system; the space domain resource may be a piece of precoding information in a predefined codebook or information about a selection of multiple directional beams; the code domain resource may be indication information of one or more codes in an available orthogonal/quasi-orthogonal code set. In addition, the physical resource allocation information may further indicate MCS information that is recommended for use. It should be noted that multiple foregoing connections may be defined between two M-Nodes, and a case in which some of physical resources corresponding to the multiple connections are the same may exist.

Therefore, after receiving the backhaul control information, the M-Node backhauls, by using a corresponding physical resource, data in a path allocated to the M-Node by using the backhaul control information. Specifically, if the backhaul control information is for an uplink backhaul request sent by the M-Node, it is assumed that the uplink backhaul is mainly that the M-Node backhauls data to the M-G-Node; if the backhaul path in the backhaul network topology control information in the backhaul control information includes multiple hops, the M-Node first backhauls to-be-backhauled data to a receive end on the first hop, and then backhauls the to-be-backhauled data from the receive end on the first hop to a receive end on the second hop, until the data is backhauled to the M-G-Node. When the data is backhauled on each hop of the backhaul path, the physical resource allocated in the physical resource allocation information may be used. Finally, after receiving the data backhauled from the M-Node, the M-G-Node completes backhaul by using a backhaul network of the M-G-Node. Likewise, if the backhaul control information is for a downlink backhaul request, it is assumed that the downlink backhaul is mainly that the M-G-Node sends data to the M-Node, and the M-G-Node backhauls the data to the M-Node hop by hop according to the backhaul path indicated by the backhaul control information and according to the backhaul control information sent by the D-Node to the M-Node that is a receive end. Certainly, if more than one backhaul path is indicated by the backhaul control information, to-be-backhauled data may be split and transmitted in multiple backhaul paths, which can implement a higher backhaul speed.

It should be noted that the foregoing steps S1003 and S1004 may be executed before or after step S1001, or may be executed with step S1001 in a crossed manner, and no limitation is imposed thereto herein. Certainly, steps S1001 and S1002 may be executed repeatedly, so that the M-Node may measure channel state information of a peripheral M-Node or M-G-Node and send the channel state information to the D-Node, or the M-G-Node may measure channel state information of a peripheral M-Node or M-G-Node and send the channel state information to the D-Node.

It may be understood that the steps S1001 and S1002 are that the D-Node obtains the channel state information of the M-Node and the M-G-Node in a coverage network of the D-Node. Certainly, in addition to the obtaining manner provided in steps S1001 and S1002, in a case in which the D-Node does not need to send a reference signal instruction message used for measuring the channel state information, the M-Node and the M-G-Node perform measurement according to another reference signal resource such as a CRS or a DMRS, to obtain the channel state information, and then send the channel state information to the D-Node. As shown in FIG. 10-*b*, a data backhaul implementation method mainly includes:

S1011. An M-Node sends a backhaul request to a D-Node.

The M-Node can implement wireless communication with the D-Node on at least one carrier and can implement wireless communication with a neighboring M-Node on at least one carrier, but the M-Node does not have a backhaul capability. Therefore, when the M-Node needs to backhaul data, the M-Node sends the backhaul request to the M-Node to request the D-Node to allocate a backhaul resource.

The M-Node is not limited to send the backhaul request only on one specific carrier, but may perform the sending on any one of multiple carriers in a case in which the multiple carriers exist in a network.

Optionally, the backhaul request sent by the M-Node may include at least one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the source/destination network information may include source/destination network type information and a source/destination network address. A network type and a network address may be a network type and a network address that are related to the field of communications. For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

S1012. An M-G-Node sends residual backhaul capability information to the D-Node.

The M-G-Node has a backhaul capability. The M-G-Node sends the residual backhaul capability information to the D-Node, so that the D-Node can refer to a residual backhaul capability of the M-G-Node when allocating a backhaul resource.

S1013. The M-Node and the M-G-Node measure channel state information according to a reference signal resource.

In a case in which the D-Node does not need to send a reference signal instruction message to indicate whether to measure the channel state information, the M-Node and the M-G-Node may measure the channel state information of a network according to a reference signal resource of the network, for example, a CRS or a DMRS provided in an LTE network.

S1014. The M-Node and the M-G-Node sends the channel state information obtained by measurement to the D-Node.

It may be understood that the channel state information sent by the M-Node and the M-G-Node to the D-Node in this embodiment of the present invention also mainly includes information such as a PMI, a CQI, and a Rank.

S1015. The D-Node sends backhaul control information to the M-Node and the M-G-Node, where the backhaul control information includes backhaul network topology control information and physical resource allocation information.

The D-Node obtains the backhaul control information according to the channel state information sent by the M-Node and the M-G-Node, the backhaul request of the M-Node, and the residual backhaul capability information of the M-G-Node and sends the backhaul control information to the M-Node and the M-G-Node.

S1016. The M-Node and the M-G-Node backhaul data according to the backhaul control information.

The M-Node and the M-G-Node send or receive data on a network topology and a carrier that are instructed by the backhaul network topology control information and physical resource allocation information in the backhaul control information.

It should be noted that the foregoing steps S1011, S1012, S1013, and S1014 do not have a required execution sequence and may be executed in a crossed manner, and no limitation is imposed thereto herein.

The D-Node may also directly obtain the channel state information of the network. Specifically, as shown in FIG. 10-*c*, a data backhaul implementation method mainly includes:

S1021. An M-Node sends a backhaul request to a D-Node.

The M-Node can implement wireless communication with the D-Node on at least one carrier and can implement wireless communication with a neighboring M-Node on at least one carrier, but the M-Node does not have a backhaul capability. Therefore, when the M-Node needs to backhaul data, the M-Node sends the backhaul request to the M-Node to request the D-Node to allocate a backhaul resource.

The M-Node is not limited to send the backhaul request only on one specific carrier, but may perform the sending on multiple carriers in a case in which the multiple carriers exist in a network.

Optionally, the backhaul request sent by the M-Node may include at least one or more items of the following content:

A1. a total data volume of a service that needs to be backhauled;

A2. an acceptable transmission delay;

A3. a priority of a to-be-backhauled service;

A4. a minimum rate that needs to be supported by the to-be-backhauled service;

A5. source/destination network information of the to-be-backhauled service.

Optionally, the source/destination network information may include source/destination network type information and a source/destination network address. A network type and a network address may be a network type and a network address that are related to the field of communications. For example, if the second network device sends a downlink backhaul request, a source network type may be Internet and a source network address may be an address of the Internet, and a destination network type may be a telecommunications network and a destination network address may be a network indicator or the like of the second network device that sends the backhaul request. If the second network device sends an uplink backhaul request, a source network type may be a telecommunications network and a source network address may be a network indicator of the second network device that sends the backhaul request, and a destination network type may be Internet and a destination network address may be an address of the Internet.

S1022. An M-G-Node sends residual backhaul capability information to the D-Node.

The M-G-Node has a backhaul capability. The M-G-Node sends the residual backhaul capability information to the D-Node, so that the D-Node can refer to a backhaul capability of the M-G-Node when allocating a backhaul resource.

The M-Node is not limited to send the residual backhaul capability information only on one specific carrier, but may perform the sending on any one of multiple carriers in a case in which the multiple carriers exist in a network.

Specifically, the residual backhaul capability information sent by the M-G-Node may include one or more items of the following content:

B1. a backhaul capability margin of the M-G-Node;
B2. a delay experienced when the M-G-Node performs backhaul;
B3. a buffer area size of the M-G-Node;
B4. a charging method for backhaul of the M-G-Node;
B5. a type of a network in which backhaul of the M-G-Node can arrive;
B6. a backhaul link reliability index.

Specifically, the backhaul capability margin in B1 is a value of a data rate that can be additionally supported by the M-G-Node; the charging method in B4 may include free of charge, monthly-package charging, or traffic-based charging; the type of a network in B5 may include Internet, a core network of a telecommunications operator, another D-Node, or another dedicated network, that is, data may be backhauled to the Internet, the core network of the telecommunications operator, the another D-Node, or the another dedicated network by using the M-G-Node; the backhaul link reliability index in B6 refers to an interruption probability of a backhaul link.

S1023. The D-Node obtains channel state information from a database of a third-party database.

In this embodiment of the present invention, the channel state information does not need to be measured by the M-Node and the M-G-Node, but can be obtained by the D-Node from the third-party database. The third-party database refers to a database of the channel state information obtained in the foregoing manner of measurement and feedback, or another manner, for example, a database of channel state information generated according to a mathematical model by using known geographical location information, or a database formed by performing measurement by another device and saving a measurement result.

S1024. The D-Node sends backhaul control information to the M-Node and the M-G-Node, where the backhaul control information includes backhaul network topology control information and physical resource allocation information.

The D-Node obtains the backhaul control information according to the channel state information sent by the M-Node and the M-G-Node, the backhaul request of the M-Node, and the residual backhaul capability information of the M-G-Node and sends the backhaul control information to the M-Node and the M-G-Node.

S1025. The M-Node and the M-G-Node backhaul data according to the backhaul control information.

The M-Node and the M-G-Node send or receive data on a network topology and a carrier that are instructed by the backhaul network topology control information and physical resource allocation information in the backhaul control information.

It should be noted that steps S1021, S1022, and S1023 do not have a required execution sequence and may be executed in a crossed manner, and no limitation is imposed thereto herein.

Certainly, in addition to the method of obtaining channel state information of an M-Node and an M-G-Node in a coverage network of a D-Node by the D-Node provided in this embodiment of the present invention, another method that can implement obtaining of channel state information of an M-Node and an M-G-Node also falls into the protection scope of the present invention, and no limitation is imposed thereto herein.

As shown in FIG. 11, an embodiment of the present invention further provides a data backhaul implementation device, which may include: a memory 1110 and at least one processor 1120 (In FIG. 11, one processor is used as an example.). In some embodiments of this embodiment of the present invention, the memory 1110 and the processor 1120 may be connected by using a bus or in another manner. In FIG. 11, a connection by using a bus is used as an example.

In some embodiments of the present invention, the processor 1120 may perform the following steps:

obtaining, according to channel state information, a backhaul request of a second network device, and residual backhaul capability information of a third network device, backhaul control information used for controlling the second network device and the third network device to backhaul data, where the backhaul control information includes backhaul network topology control information and physical resource allocation information; and sending the backhaul control information to the second network device and the third network device, so that the second network device and the third network device backhaul data according to the backhaul control information; or sending a backhaul request to a first network device, where the backhaul request is used to request backhaul control information from the first network device, and the backhaul control information includes backhaul network topology control information and physical resource allocation information; receiving the backhaul control information broadcasted by the first network device, where the backhaul control information is obtained by the first network device according to channel state information, the backhaul request, and residual backhaul capability information sent by a third network device; and backhauling data according to the backhaul control information; or send residual backhaul capability information to a first network device, where the residual backhaul capability information is used to notify the first network device of a residual backhaul capability of a third network device, and the backhaul control information includes backhaul network topology control information and physical resource allocation information; receiving backhaul control information broadcasted by the first network device, where the backhaul control information is obtained by the first network device according to channel state information, a backhaul request sent by a second network device, and the residual backhaul capability information; and backhauling data according to the backhaul control information.

In some embodiments of the present invention, the processor 1120 may further perform the following steps:

broadcasting a reference signal instruction message to the second network device and the third network device, where the reference signal instruction message is used to instruct one or more network devices of the second network device or the third network device to send a reference signal and another network device to measure the channel state information.

In some embodiments of the present invention, the processor 1120 may further perform the following steps:

receiving the channel state information sent by the second network device and the third network device, where the channel state information is obtained by the second network device and the third network device by performing measurement according to the reference signal instruction message, and the channel state information includes a precoding matrix indicator PMI, a channel quality indicator CQI, and a Rank.

In some embodiments of the present invention, the processor 1120 may further perform the following steps:

obtaining the channel state information by using a third-party database.

In some embodiments of the present invention, the processor 1120 may further perform the following steps:

receiving the channel state information sent by the second network device and the third network device, where the channel state information is obtained by the second network device and the third network device by performing measurement according to a reference signal resource, and the reference signal resource includes a common reference signal CRS and a demodulation reference signal DMRS.

In some embodiments of the present invention, the processor 1120 may further perform the following steps:

receiving the backhaul request sent by the second network device, where the backhaul request includes at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

In some embodiments of the present invention, the processor 1120 may further perform the following steps:

receiving the residual backhaul capability information sent by the third network device, where the residual backhaul capability information includes at least one of the following: a backhaul capability margin, a delay experienced during backhaul, a buffer area size, a backhaul charging method, a type of a network in which backhaul arrives, or a backhaul link reliability index.

In some embodiments of the present invention, the processor 1120 may further perform the following steps:

backhauling, by the second network device by using the physical resource indicated by the physical resource allocation information, data in the backhaul path included in the backhaul network topology control information; and backhauling, by the third network device, data by using a backhaul capability of the third network device according to the backhaul control information.

In some embodiments of the present invention, the processor 1120 may further perform the following steps:

receiving a reference signal instruction message broadcasted by the first network device, where the reference signal instruction message is used to instruct to send a reference signal or measure the channel state information.

In some embodiments of the present invention, the processor 1120 may further perform the following steps:

if the received reference signal instruction message instructs to send a reference signal, sending the reference signal according to the reference signal instruction message; or if the received reference signal instruction message instructs to measure the channel state information, measuring feedback parameters such as a precoding matrix indicator PMI, a channel quality indicator CQI, and a Rank according to an instruction of the reference signal instruction message, to obtain the channel state information; and sending the channel state information obtained by measurement to the first network device, where the channel state information includes the feedback parameters such as the PMI, the CQI, and the Rank.

In some embodiments of the present invention, the processor 1120 may further perform the following steps:

backhauling, by the second network device by using the physical resource indicated by the physical resource allocation information, data in the backhaul path included in the backhaul network topology control information; and backhauling, by the third network device, data by using a backhaul capability of the third network device according to the backhaul control information.

In some embodiments of the present invention, the memory 1110 may be configured to store the backhaul control information, the channel state information, the backhaul request, and the residual backhaul capability information.

In some embodiments of the present invention, the memory 1110 may be further configured to store the reference signal instruction message.

In some embodiments of the present invention, the memory 1110 may be further configured to store the backhaul network topology control information and the physical resource allocation information.

In some embodiments of the present invention, the memory 1110 may be further configured to store the reference signal resource.

A person of ordinary skill in the art may understand that all or some of the steps of the methods in the embodiments may be implemented by program instructing relevant hardware. The program may be stored in a computer readable storage medium. The storage medium may include a read-only memory, a magnetic disk, or an optical disc.

The above describes in detail a network device and a data backhaul implementation system and method that are provided in the present invention. For a person of ordinary skill in the art, a modification may be made to a specific implementation manner and an application scope based on concepts of the embodiments of the present invention. Therefore, content of the specification shall not be construed as a limitation to the present invention.

What is claimed is:

1. A network device, comprising a memory, and a processor, wherein the memory stores a group of program code, and the processor is configured to call the program code stored in the memory, to execute the following operations:
   obtaining, according to channel state information, a backhaul request of a second network device, residual backhaul capability information of a third network device, and backhaul control information used for controlling the second network device and the third network device to backhaul data, wherein the backhaul control information comprises backhaul network topology control information and physical resource allocation information;
   broadcasting the backhaul control information to the second network device and the third network device, so that the second network device and the third network device backhaul data according to the backhaul control information; and
   broadcasting a reference signal instruction message to the second network device and the third network device, wherein the reference signal instruction message is used to instruct one or more network devices of the second network device or the third network device to send a reference signal and another network device to measure the channel state information.

2. The network device according to claim 1, wherein the network device further comprises:
   receiving the channel state information from the second network device and the third network device, wherein the channel state information is obtained by the second network device and the third network device by performing measurement according to the reference signal instruction message, and the channel state information comprises a precoding matrix indicator (PMI), a channel quality indicator (CQI), and a rank.

3. The network device according to claim 1, wherein the network device further comprises:
   obtaining the channel state information by using a third-party database.

4. The network device according to claim 1, wherein the network device further comprises:
   receiving the channel state information from the second network device and the third network device, wherein the channel state information is obtained by the second network device and the third network device by performing measurement according to a reference signal.

5. The network device according to claim 1, wherein the network device further comprises:
   receiving the backhaul request from the second network device, wherein the backhaul request comprises at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

6. The network device according to claim 1, wherein the network device further comprises:
   receiving the residual backhaul capability information from the third network device, wherein the residual backhaul capability information comprises at least one of the following: a backhaul capability margin, a delay experienced during backhaul, a buffer area size, a backhaul charging method, a type of a network in which backhaul arrives, or a backhaul link reliability index.

7. The network device according to claim 1, wherein the backhaul network topology control information in the backhaul control information comprises at least one backhaul path, and the backhaul path is allocated to the second network device that sends the backhaul request; the physical resource allocation information in the backhaul control information comprises a corresponding physical resource that can be used in the backhaul path when the backhaul path comprised in the backhaul network topology control information is used; and
   further, sending the backhaul control information to the second network device and the third network device, so that the second network device backhauls, by using the physical resource indicated by the physical resource allocation information, data in the backhaul path comprised in the backhaul network topology control information, and after receiving the backhaul control information, the third network device backhauls data according to the backhaul control information by using a backhaul capability of the third network device.

8. A data backhaul implementation system, comprising: a first network device, a second network device, and a third network device, wherein:
   the first network device is configured to:
      obtain, according to channel state information, a backhaul request of the second network device, residual backhaul capability information of the third network device, and backhaul control information used for controlling the second network device and the third network device to backhaul data;
      broadcast the backhaul control information to the second network device and the third network device, so that the second network device and the third network device backhaul data according to the backhaul control information; and
      broadcast a reference signal instruction message to the second network device and the third network device, wherein the reference signal instruction message is used to instruct one or more network devices of the second network device or the third network device to send a reference signal and another network device to measure the channel state information;
   the second network device is configured to:
      send the backhaul request to the first network device, wherein the backhaul request is used to request the backhaul control information from the first network device; and
      receive the backhaul control information broadcasted by the first network device, and backhaul data according to the backhaul control information; and
   the third network device is configured to:
      send the residual backhaul capability information to the first network device, wherein the residual backhaul capability information comprises information about a backhaul capability that is left after data is backhauled according to a backhaul capability of the third network device; and
      receive the backhaul control information sent by the first network device, and backhaul data according to the backhaul control information; wherein
   the backhaul control information comprises backhaul network topology control information and physical resource allocation information.

9. A data backhaul implementation method, comprising:
   broadcasting a reference signal instruction message to a second network device and a third network device, wherein the reference signal instruction message is used to instruct one or more network devices of the second network device or the third network device to send a reference signal and another network device to measure channel state information;

obtaining, according to the channel state information, a backhaul request of the second network device, residual backhaul capability information of the third network device, and backhaul control information used for controlling the second network device and the third network device to backhaul data, wherein the backhaul control information comprises backhaul network topology control information and physical resource allocation information; and sending the backhaul control information to the second network device and the third network device, so that the second network device and the third network device backhaul data according to the backhaul control information.

10. The method according to claim 9, wherein after the broadcasting a reference signal instruction message to the second network device and the third network device, the method comprises the following step:

receiving the channel state information sent by the second network device and the third network device, wherein the channel state information is obtained by the second network device and the third network device by performing measurement according to the reference signal instruction message, and the channel state information comprises a precoding matrix indicator PMI, a channel quality indicator CQI, and a rank.

11. The method according to claim 9, wherein before the obtaining backhaul control information used for controlling the second network device and the third network device to backhaul data, the method comprises the following step:

obtaining the channel state information by using a third-party database.

12. The method according to claim 9, wherein before the obtaining backhaul control information used for controlling the second network device and the third network device to backhaul data, the method comprises the following step:

receiving the channel state information from the second network device and the third network device, wherein the channel state information is obtained by the second network device and the third network device by performing measurement according to a reference signal resource, and the reference signal resource comprises a common reference signal CRS and a demodulation reference signal DMRS.

13. The method according to claim 9, wherein before the obtaining backhaul control information used for controlling the second network device and the third network device to backhaul data, the method comprises the following step:

receiving the backhaul request from the second network device, wherein the backhaul request comprises at least one of the following: a total data volume of a service that needs to be backhauled, an allowed transmission delay, a priority of a to-be-backhauled service, a minimum rate that needs to be supported by the to-be-backhauled service, or source/destination network information of the to-be-backhauled service.

14. The method according to claim 9, wherein before the obtaining backhaul control information used for controlling the second network device and the third network device to backhaul data, the method comprises the following step:

receiving the residual backhaul capability information from the third network device, wherein the residual backhaul capability information comprises at least one of the following: a backhaul capability margin, a delay experienced during backhaul, a buffer area size, a backhaul charging method, a type of a network in which backhaul arrives, or a backhaul link reliability index.

15. The method according to claim 9, wherein the backhaul network topology control information in the backhaul control information comprises at least one backhaul path, and the backhaul path is allocated to the second network device that sends the backhaul request; the physical resource allocation information in the backhaul control information comprises a corresponding physical resource that can be used in the backhaul path when the backhaul path comprised in the backhaul network topology control information is used; and further, that the second network device and the third network device backhaul data according to the backhaul control information comprises:

the second network device backhauls, by using the physical resource indicated by the physical resource allocation information, data in the backhaul path comprised in the backhaul network topology control information, and the third network device backhauls data according to the backhaul control information by using a backhaul capability of the third network device.

* * * * *